US012625070B2

(12) United States Patent
Xu

(10) Patent No.: US 12,625,070 B2
(45) Date of Patent: May 12, 2026

(54) METHOD FOR QUALITY INSPECTION OF ETCHING PASTE MATERIAL BASED ON SPECTRAL RESPONSE DIFFERENCE

(71) Applicant: JIANGSU SAMBON TECHNOLOGY CO., LTD., Suzhou (CN)

(72) Inventor: Zijing Xu, Suzhou (CN)

( * ) Notice: Subject to any disclaimer, the term of this patent is extended or adjusted under 35 U.S.C. 154(b) by 0 days.

(21) Appl. No.: 19/330,938

(22) Filed: Sep. 17, 2025

(65) Prior Publication Data

US 2026/0016405 A1 Jan. 15, 2026

(51) Int. Cl.
*G01N 21/3577* (2014.01)
*G01N 21/39* (2006.01)
*G01N 21/94* (2006.01)
G01N 21/17 (2006.01)

(52) U.S. Cl.
CPC ......... *G01N 21/3577* (2013.01); *G01N 21/39* (2013.01); *G01N 21/94* (2013.01); *G01N 2021/1761* (2013.01); *G01N 2201/11* (2013.01)

(58) Field of Classification Search
CPC .... G01N 21/3577; G01N 21/35; G01N 21/31; G01N 21/25; G01N 21/17; G01N 21/00; G01N 21/39; G01N 21/94; G01N 21/88; G01N 21/84; G01N 2021/1761; G01N 2021/17; G01N 2201/11; G01N 2201/10; G01N 2201/00; G01N 25/00; G01N 1/32; G01N 29/00
See application file for complete search history.

(56) References Cited

U.S. PATENT DOCUMENTS

| | | | |
|---|---|---|---|
| 9,075,026 B2 | 7/2015 | Urano | |
| 11,703,460 B2 | 7/2023 | Xu et al. | |
| 2018/0038803 A1* | 2/2018 | Cui | G01N 21/956 |
| 2020/0074617 A1 | 3/2020 | Zeng et al. | |
| 2021/0150116 A1* | 5/2021 | Fan | G03F 7/70633 |
| 2022/0065797 A1* | 3/2022 | Terasawa | G01N 21/8806 |
| 2023/0137537 A1 | 5/2023 | Pawlowski et al. | |
| 2025/0164411 A1* | 5/2025 | McGahan | G01N 23/20025 |

* cited by examiner

*Primary Examiner* — Mohamed Charioui
(74) *Attorney, Agent, or Firm* — Sam Pierce

(57) ABSTRACT

A method for quality inspection of an etching paste material based on a spectral response difference, including: identifying a position of density mutation boundary through spectral collection and density gradient analysis. Applying a specific frequency beam to obtain the resonance response parameter, generating stress field reconstruction data. Performing a reverse optical tracking to obtain a defect formation path, generating degradation prediction data. Establishing a self-organizing optical monitoring grid, to form a hierarchical spectral fingerprint library. Constructing a multi-point linked defect blocking network, to form an interconnected optical energy field. Monitoring a cooperative response to obtain network stability data, Identifying abnormal position coordinates based on a material quality grade and the network stability data, obtaining the abnormal position coordinates. Performing a phase adjustment to obtain a phase difference spectral set, conducting a phase comparison marking on the abnormal position coordinates, completing the quality inspection of the etching paste material.

8 Claims, 6 Drawing Sheets

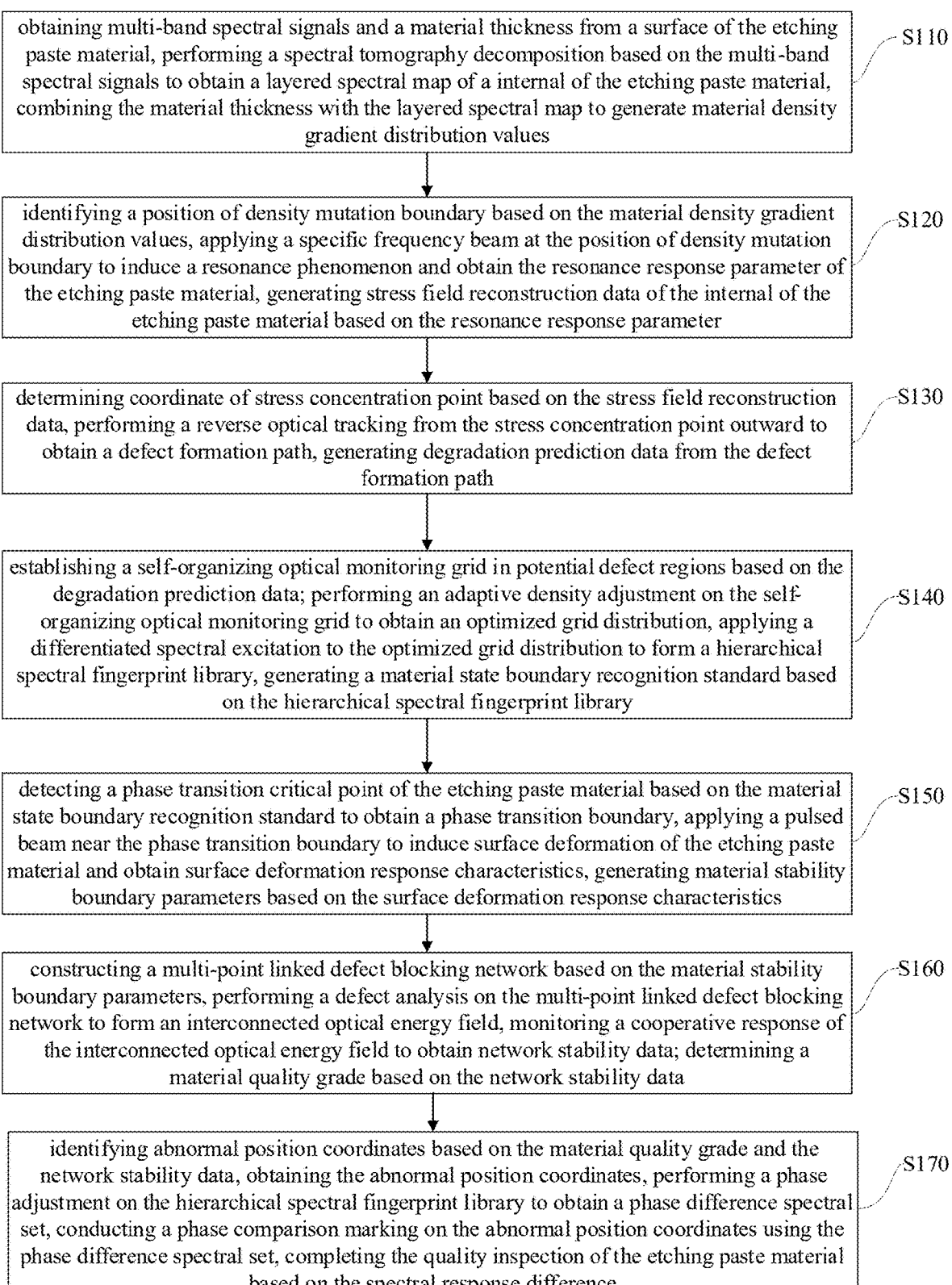

obtaining multi-band spectral signals and a material thickness from a surface of the etching paste material, performing a spectral tomography decomposition based on the multi-band spectral signals to obtain a layered spectral map of a internal of the etching paste material, combining the material thickness with the layered spectral map to generate material density gradient distribution values — S110 identifying a position of density mutation boundary based on the material density gradient distribution values, applying a specific frequency beam at the position of density mutation boundary to induce a resonance phenomenon and obtain the resonance response parameter of the etching paste material, generating stress field reconstruction data of the internal of the etching paste material based on the resonance response parameter — S120 determining coordinate of stress concentration point based on the stress field reconstruction data, performing a reverse optical tracking from the stress concentration point outward to obtain a defect formation path, generating degradation prediction data from the defect formation path — S130 establishing a self-organizing optical monitoring grid in potential defect regions based on the degradation prediction data; performing an adaptive density adjustment on the self-organizing optical monitoring grid to obtain an optimized grid distribution, applying a differentiated spectral excitation to the optimized grid distribution to form a hierarchical spectral fingerprint library, generating a material state boundary recognition standard based on the hierarchical spectral fingerprint library — S140 detecting a phase transition critical point of the etching paste material based on the material state boundary recognition standard to obtain a phase transition boundary, applying a pulsed beam near the phase transition boundary to induce surface deformation of the etching paste material and obtain surface deformation response characteristics, generating material stability boundary parameters based on the surface deformation response characteristics — S150 constructing a multi-point linked defect blocking network based on the material stability boundary parameters, performing a defect analysis on the multi-point linked defect blocking network to form an interconnected optical energy field, monitoring a cooperative response of the interconnected optical energy field to obtain network stability data; determining a material quality grade based on the network stability data — S160 identifying abnormal position coordinates based on the material quality grade and the network stability data, obtaining the abnormal position coordinates, performing a phase adjustment on the hierarchical spectral fingerprint library to obtain a phase difference spectral set, conducting a phase comparison marking on the abnormal position coordinates using the phase difference spectral set, completing the quality inspection of the etching paste material based on the spectral response difference — S170

FIG. 1

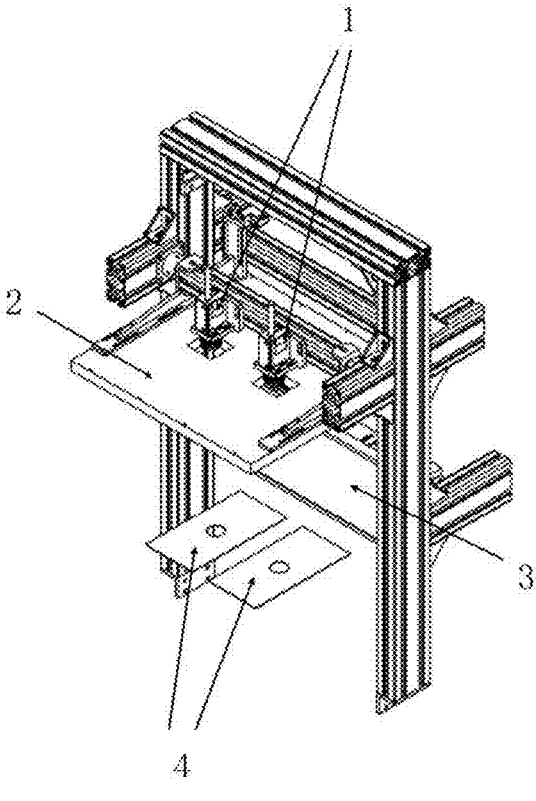

FIG. 2

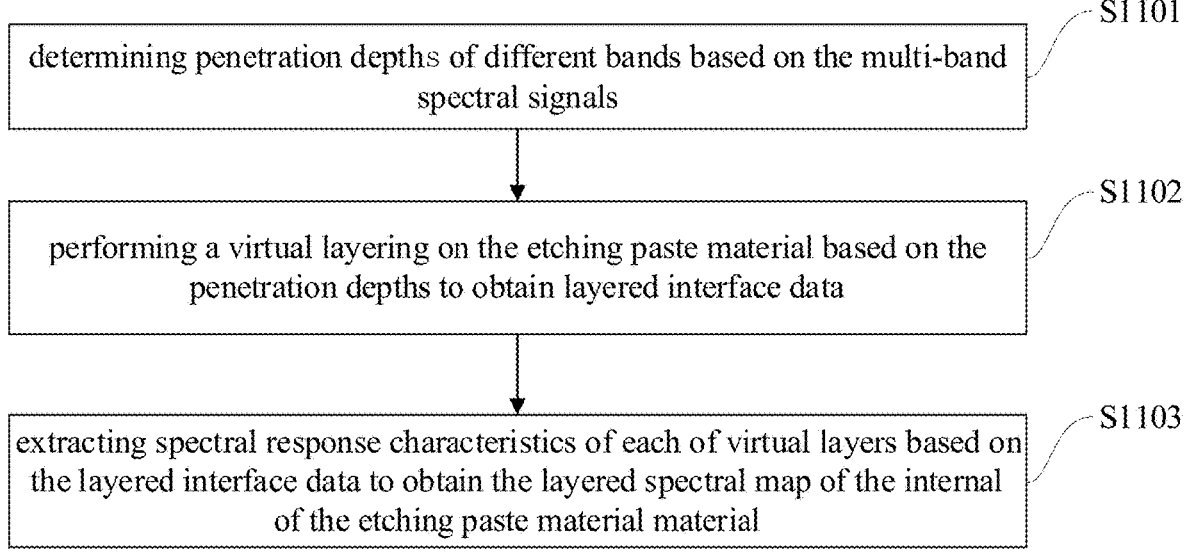

| | |
|---|---|
| determining penetration depths of different bands based on the multi-band spectral signals | S1101 |
| performing a virtual layering on the etching paste material based on the penetration depths to obtain layered interface data | S1102 |
| extracting spectral response characteristics of each of virtual layers based on the layered interface data to obtain the layered spectral map of the internal of the etching paste material material | S1103 |

FIG. 3

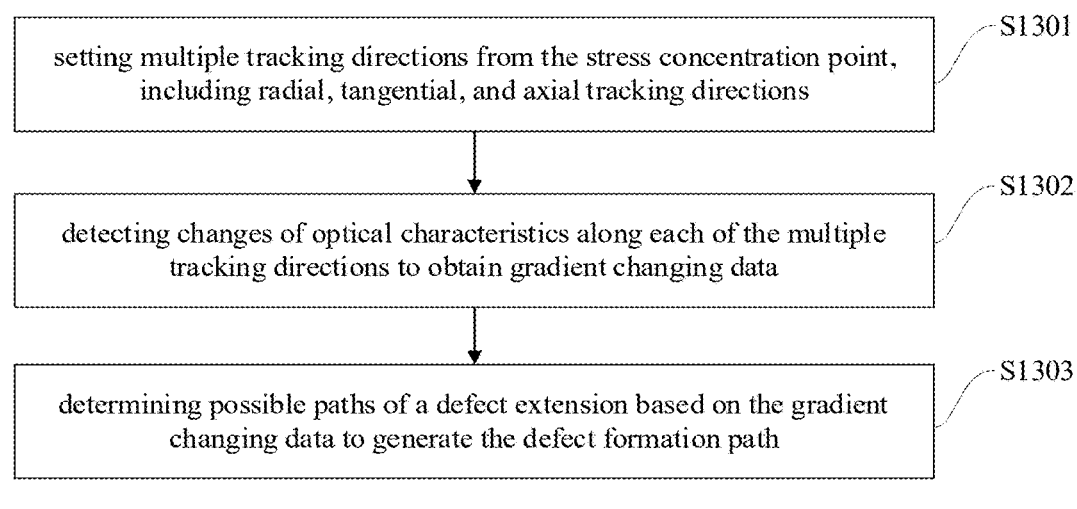

S1301 setting multiple tracking directions from the stress concentration point, including radial, tangential, and axial tracking directions

S1302 detecting changes of optical characteristics along each of the multiple tracking directions to obtain gradient changing data

S1303 determining possible paths of a defect extension based on the gradient changing data to generate the defect formation path

FIG. 6

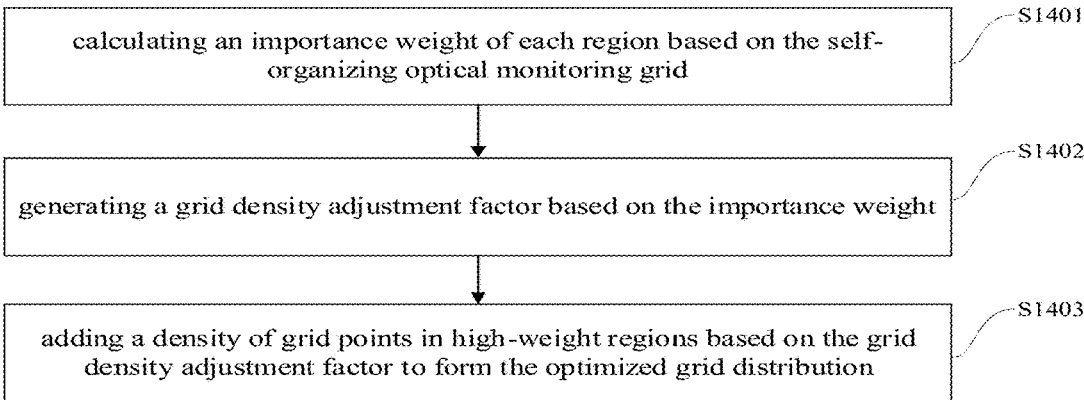

S1401 calculating an importance weight of each region based on the self-organizing optical monitoring grid

S1402 generating a grid density adjustment factor based on the importance weight

S1403 adding a density of grid points in high-weight regions based on the grid density adjustment factor to form the optimized grid distribution

FIG. 7

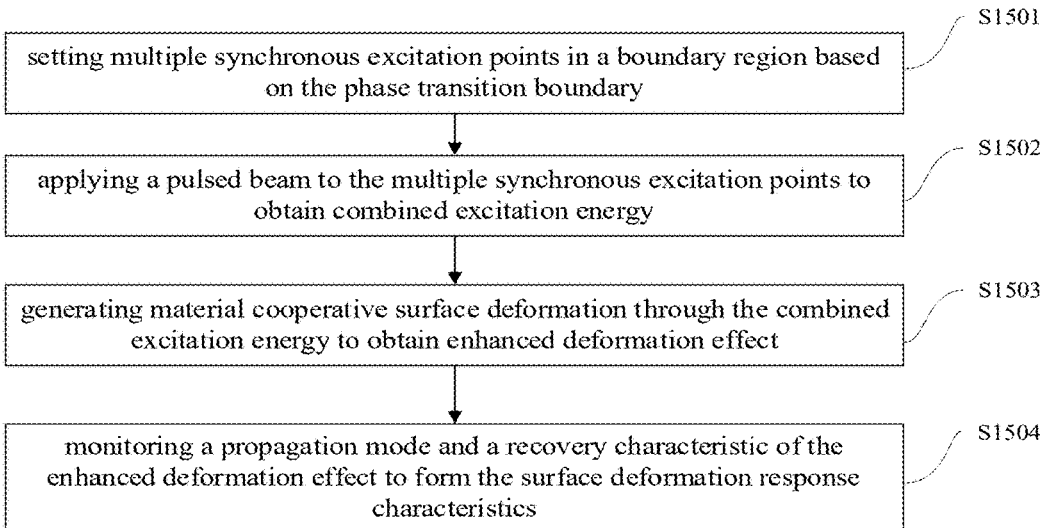

S1501 setting multiple synchronous excitation points in a boundary region based on the phase transition boundary

S1502 applying a pulsed beam to the multiple synchronous excitation points to obtain combined excitation energy

S1503 generating material cooperative surface deformation through the combined excitation energy to obtain enhanced deformation effect

S1504 monitoring a propagation mode and a recovery characteristic of the enhanced deformation effect to form the surface deformation response characteristics

FIG. 8

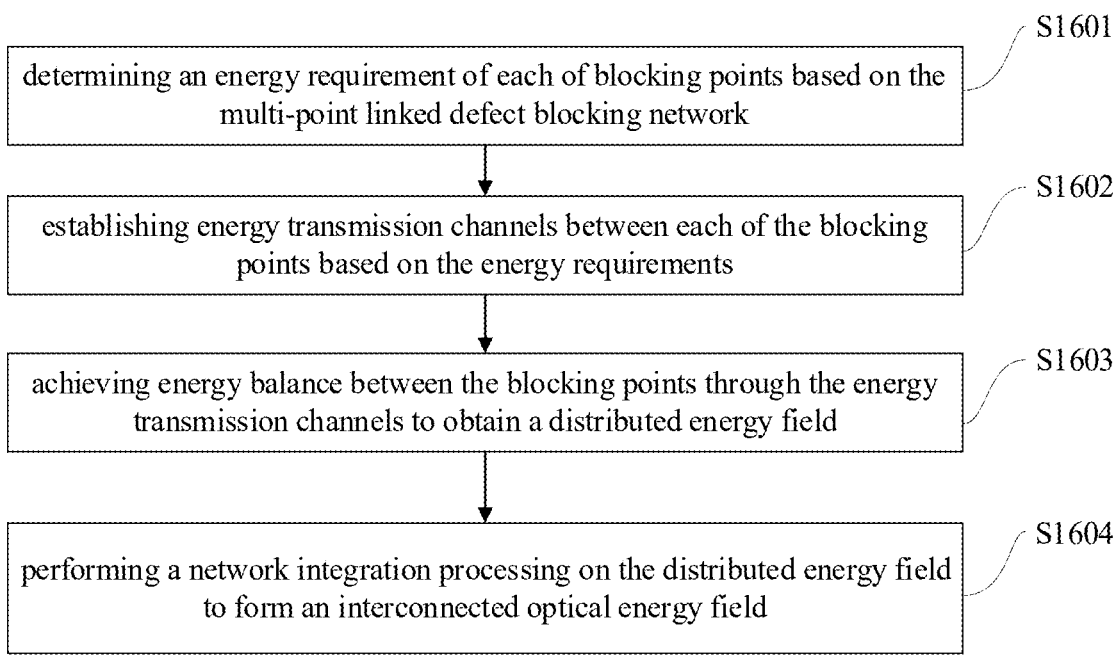

S1601 determining an energy requirement of each of blocking points based on the multi-point linked defect blocking network

S1602 establishing energy transmission channels between each of the blocking points based on the energy requirements

S1603 achieving energy balance between the blocking points through the energy transmission channels to obtain a distributed energy field

S1604 performing a network integration processing on the distributed energy field to form an interconnected optical energy field

FIG. 9

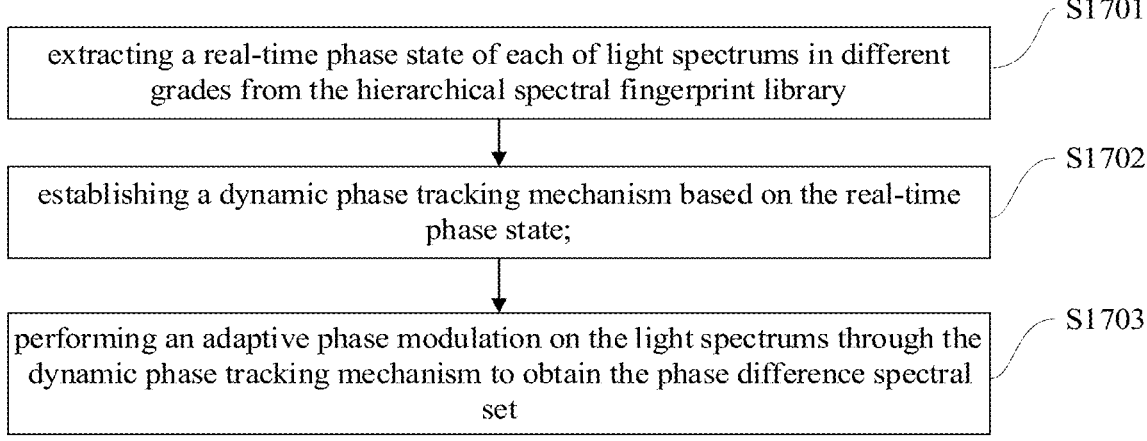

S1701 extracting a real-time phase state of each of light spectrums in different grades from the hierarchical spectral fingerprint library

S1702 establishing a dynamic phase tracking mechanism based on the real-time phase state;

S1703 performing an adaptive phase modulation on the light spectrums through the dynamic phase tracking mechanism to obtain the phase difference spectral set

FIG. 10

METHOD FOR QUALITY INSPECTION OF ETCHING PASTE MATERIAL BASED ON SPECTRAL RESPONSE DIFFERENCE

TECHNICAL FIELD

The present disclosure relates to the technical field of optical detection technology, in particular to a method for a quality inspection of an etching paste material based on a spectral response difference.

BACKGROUND

In the production of solar cells, etching paste material, as an important auxiliary printing material, is widely used in the manufacturing process of solar cell panels. The etching paste is in a gel-like form and is primarily used for etching transparent metal conductive coatings, enabling fine etching patterns to be created through screen printing. Compared to traditional etching processes, after the etching paste is printed, it does not require treatment with strong acids or alkalis, making it more convenient and cleaner, thus meeting the requirements of modern green manufacturing.

However, the etching paste material faces complex quality control challenges in actual use. Due to issues such as uneven density distribution, component segregation, and microscopic defects within the etching paste material, these internal structural abnormalities can gradually evolve into macroscopic defects during material use, affecting the consistency and reliability of the etching effect. Traditional quality inspection methods mainly rely on surface observation and simple physical tests, making it difficult to analyze the microscopic structural state, stress distribution, and potential degradation risks within the material. In particular, existing detection technologies lack effective analytical methods for key quality indicators such as internal material density gradient changes, stress concentration regions, and phase transition characteristics. These detection blind spots often result in quality problems being discovered only in the later stages of material use, preventing early warning and preventive quality control, which severely impacts production stability and the consistency of product quality.

SUMMARY

The present disclosure provides a method for a quality inspection of an etching paste material based on a spectral response difference, aims to construct a multidimensional material characteristic analysis framework, deeply explore the spectral phase response patterns of etching paste materials, and establish a complete detection chain from the microstructure to the macroscopic performance of the material, thereby achieving precise, comprehensive, and intelligent quality detection of etching paste materials.

To realize the above objective, the present disclosure provides a method for a quality inspection of an etching paste material based on a spectral response difference, including the following steps.

Obtaining multi-band spectral signals and a material thickness from a surface of the etching paste material, performing a spectral tomography decomposition based on the multi-band spectral signals to obtain a layered spectral map of a internal of the etching paste material, combining the material thickness with the layered spectral map to generate material density gradient distribution values.

Identifying a position of density mutation boundary based on the material density gradient distribution values, applying a specific frequency beam at the position of density mutation boundary to induce a resonance phenomenon and obtain the resonance response parameter of the etching paste material, generating stress field reconstruction data of the internal of the etching paste material based on the resonance response parameter.

Determining coordinate of stress concentration point based on the stress field reconstruction data, performing a reverse optical tracking from the stress concentration point outward to obtain a defect formation path, generating degradation prediction data from the defect formation path.

Establishing a self-organizing optical monitoring grid in potential defect regions based on the degradation data; performing an adaptive density adjustment on the self-organizing optical monitoring grid to obtain an optimized grid distribution, applying a differentiated spectral excitation to the optimized grid distribution to form a hierarchical spectral fingerprint library, generating a material state boundary recognition standard based on the hierarchical spectral fingerprint library.

Detecting a phase transition critical point of the etching paste material based on the material state boundary recognition standard to obtain a phase transition boundary, applying a pulsed beam near the phase transition boundary to induce surface deformation of the etching paste material and obtain surface deformation response characteristics, generating material stability boundary parameters based on the surface deformation response characteristics.

Constructing a multi-point linked defect blocking network based on the material stability boundary parameters, performing a defect analysis on the multi-point linked defect blocking network to form an interconnected optical energy field, monitoring a cooperative response of the interconnected optical energy field to obtain network stability data; determining a material quality grade based on the network stability data.

Identifying abnormal position coordinates based on the material quality grade and the network stability data, obtaining the abnormal position coordinates, performing a phase adjustment on the hierarchical spectral fingerprint library to obtain a phase difference spectral set, conducting a phase comparison marking on the abnormal position coordinates using the phase difference spectral set, completing the quality inspection of the etching paste material based on the spectral response difference.

The beneficial effects of the present disclosure are reflected in the following aspects.

Firstly, by using material density gradient analysis and resonance excitation technology, the disclosure can identify the position of density mutation boundaries within the etching paste material and reconstruct the stress field distribution. This enables the detection of internal defects and stress concentration areas that are difficult to identify with traditional methods, achieving an in-depth analysis of the internal quality state of the etching paste material.

Secondly, the disclosure establishes a self-organizing optical monitoring grid and a graded spectral fingerprint database. By using differentiated spectral excitation strategies, it generates spectral feature standards for different quality levels. Combined with the multi-point collaborative response monitoring of defect-blocking networks, it enables accurate classification of material quality and network-based evaluation, enhancing the accuracy and reliability of quality judgment.

Finally, by using reverse optical tracking to generate defect formation paths and degradation prediction data, along with phase transition critical point detection and surface deformation response feature analysis, the disclosure can predict the degradation trend and stability boundaries of the material. Ultimately, by achieving precise marking of abnormal locations through spectral phase response differences, it forms a complete detection system from defect detection, degradation prediction to quality grading.

It should be understood that the above general description and the detailed description that follows are merely exemplary and explanatory, and do not limit the scope of this application.

BRIEF DESCRIPTION OF THE DRAWINGS

The drawings illustrate specific examples of the technical solution described in the present disclosure, and form part of the description for explaining the technical solution, principles, and effects of the disclosure.

Unless otherwise stated, the same reference numerals in different drawings represent the same or similar technical features. Different reference numerals may also be used to represent the same or similar technical features.

FIG. 1 is a flowchart of a method for a quality inspection of an etching paste material based on a spectral response difference according an embodiment of the present disclosure.

FIG. 2 is a structural diagram of a multi-band spectral acquisition system in the present disclosure.

FIG. 3 is a first detailed flowchart of the method for the quality inspection of the etching paste material based on the spectral response difference according an embodiment of the present disclosure.

FIG. 6 is a fourth detailed flowchart of the method for the quality inspection of the etching paste material based on the spectral response difference according an embodiment of the present disclosure FIG. 7 is a fifth detailed flowchart of the method for the quality inspection of the etching paste material based on the spectral response difference according an embodiment of the present disclosure.

FIG. 8 is a sixth detailed flowchart of the method for the quality inspection of the etching paste material based on the spectral response difference according an embodiment of the present disclosure.

FIG. 9 is a seventh detailed flowchart of the method for the quality inspection of the etching paste material based on the spectral response difference according an embodiment of the present disclosure.

FIG. 10 is an eighth detailed flowchart of the method for the quality inspection of the etching paste material based on the spectral response difference according an embodiment of the present disclosure.

Figure 4:
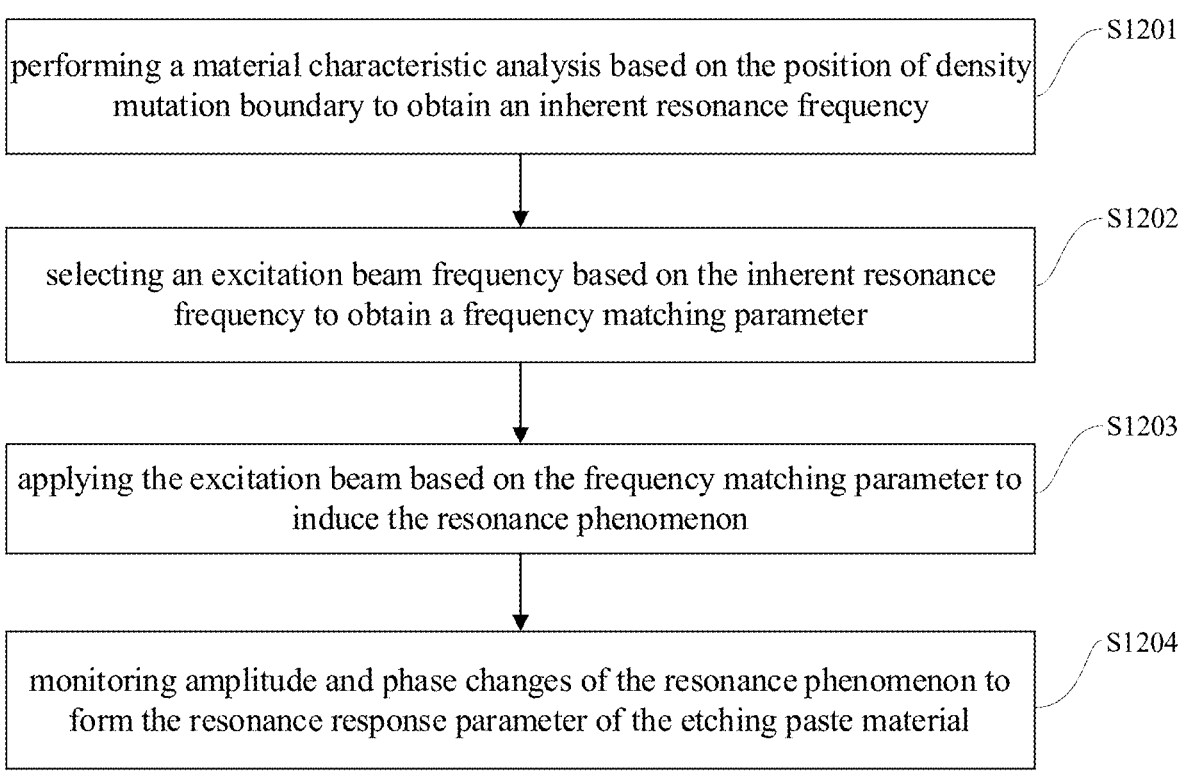
FIG. 4 is a second detailed flowchart of the method for the quality inspection of the etching paste material based on the spectral response difference according an embodiment of the present disclosure.

Description of the reference numeral: 1, area array camera; 2, front light source; 3, side light source; 4, object to be test.

DETAILED DESCRIPTION OF THE EMBODIMENTS

In the following description, specific details such as particular system structures and technologies are provided to facilitate a thorough understanding of the embodiments of the present application. However, it should be understood by those skilled in the art that these embodiments can be implemented without these specific details. In other cases, detailed descriptions of well-known systems, circuits, and methods are omitted to avoid unnecessary details that may hinder the description of this application.

It should be understood that when the term "include" is used in the specification and appended claims of this application, it indicates the presence of the described features, components, steps, operations, elements, and/or components, but does not exclude the presence or addition of one or more other features, components, steps, operations, elements, and/or their combinations.

It should also be understood that the term "and/or" used in the specification and appended claims refers to any combination of one or more of the listed items and all possible combinations, including those combinations.

The technical solutions of the embodiments of the present application are described below.

As shown in FIG. 1, an embodiment of the present disclosure provides a method for quality inspection of an etching paste material based on the spectral response difference, which includes the following steps S110 to S170.

S110, obtaining multi-band spectral signals and a material thickness from a surface of the etching paste material, performing a spectral tomography decomposition based on the multi-band spectral signals to obtain a layered spectral map of a internal of the etching paste material, combining the material thickness with the layered spectral map to generate the material density gradient distribution values.

Specifically, multi-band spectral acquisition is performed on the surface of the etching paste material. As shown in FIG. 2. A stereoscopic structural design is adopted, which includes key components such as an area array camera 1, a front light source 2, a side light source 3, and an object to be test 4. The area array camera 1 uses a high-sensitivity complementary metal oxide semiconductor (CMOS) sensor with a pixel resolution of 2048×2048, ensuring that more than 80% of the etching paste material occupies the field of view. A multi-band light source system includes a ultraviolet light source (300-400 nm), a visible light source (400-700 nm), a near-infrared light source (700-1100 nm), a short-wave infrared light source (1100-1700 nm), and a mid-wave infrared light source (1700-2500 nm), all configured with light emitting diode (LED) arrays, with light intensity stability controlled within ±0.5%. The front light source 2 provides uniform diffuse illumination, while the side light source 3 is configured at a 45° tilt angle to eliminate shadow and reflection interference. The object to be test 4 is the etching paste material, sample to be detected, which is precisely positioned using a precision positioning platform. The spectral resolution is set to 0.1 nm, and the dynamic range is 16 bit. A laser triangulation module is integrated for material thickness measurement with an accuracy of 0.01 mm. A hard trigger controller ensures precise synchronization between the light source and the camera. When the object to be test 4 is moved to the detection position, the light source is automatically activated, and the area array camera 1 is triggered to collect multi-band spectral signals and material thickness.

As shown in FIG. 3, a part of S110, performing a spectral tomography decomposition based on the multi-band spectral signals to obtain a layered spectral map of a internal of the etching paste material, includes the following steps of S1101-S1103.

S1101, determining penetration depths of different bands based on the multi-band spectral signals.

S1102, performing a virtual layering on the etching paste material based on the penetration depths to obtain layered interface data.

S1103, extracting spectral response characteristics of each of virtual layers based on the layered interface data to obtain the layered spectral map of the internal of the etching paste material material.

Specifically, determining an effective penetration depth of the different bands in the etching paste material based on the attenuation characteristics of the multi-band spectral signals. This is achieved by comparing intensity attenuation patterns of the spectral signals of etching paste material samples of different thicknesses. In a calculation of an attenuation coefficient $\alpha(\lambda)=-\ln(I/I_0)/t$, I is a transmitted light intensity, $I_0$ is an incident light intensity, and t is a thickness. A 1/e attenuation standard is used to define the penetration depth, i.e., the thickness corresponding to the light intensity decay to 1/e of its initial value. Bands are classified based on their penetration abilities into five levels: ultra-shallow penetration (300-300 nm, depth <0.1 mm), shallow penetration (300-500 nm, depth 0.1-0.8 mm), medium penetration (500-1000 nm, depth 0.8-3 mm), deep penetration (1000-1800 nm, depth 3-8 mm), and ultra-deep penetration (1800-2500 nm, depth >8 mm). The optical parameters of the etching paste material are corrected by considering the refractive index, scattering coefficient, absorption coefficient, and other factors, ultimately creating an accurate penetration depth database for each of the different bands.

Performing the virtual layering on the etching paste material based on the penetration depths to determine the boundary positions and thickness distribution of each layer. The layering strategy adopts an arithmetic progression for penetration depths, with a main number of layers set to 5-7, corresponding to a number of main bands. The thickness of the i-th layer is calculated using the geometric mean of adjacent penetration depths, $t\_i=(D\_i{+}1{-}D\_i)/2$ where $D\_i{+}1$ is the i-th penetration depth characteristic value, and $D\_i$ is the i-th penetration depth characteristic value. Layer interface data includes geometric parameters such as interface position coordinates, tilt angle, and roughness. Cubic spline interpolation ensures continuity at the interfaces. Layer quality is evaluated through the spectral uniformity within layers and the difference between layers. A dynamic layering adjustment mechanism adaptively adjusts the number and thickness of layers based on changes in penetration depth, forming complete layered interface data.

Extracting spectral response characteristics of each of virtual layers based on the layered interface data to obtain the layered spectral map of the internal of the etching paste material material. A z-direction range of an i-th virtual layer is determined by a difference between adjacent interface coordinates. The interface tilt angle $\theta\_i$ geometrically modifies the light transmission path length, and interface roughness $\sigma\_i$ affects light scattering properties. The transmission matrix T is constructed based on the geometric constraints of the interfaces, with matrix elements $T\_ij=\alpha\_ij{\times}\sec(\theta\_i){\times}S\_i{\times}L\_ij$, where $\alpha\_ij$ is a basic absorption coefficient, sec $(\theta\_i)$ is a light path correction factor, $S\_i$ is the scattering loss coefficient, and $L\_ij$ is an effective optical path length. A spectral separation mathematical model $S\_layer=T^{\wedge}(-1){\times}S\_measured$ is used, where, $S\_layer$ is a spectral vector of each of the virtual layers, and $S\_measured$ is a measured composite spectral vector. An interface sharpness parameter $R\_i$ is used to constrain a degree of spectral aliasing between the adjacent layers. When the interface is clear, hard boundary separation is used, and when the interface is blurred, soft boundary processing is applied. Finally, a material internal layered spectral map reflecting the optical characteristic distribution within the material is established.

Combining the material thickness with the layered spectral map to generate the material density gradient distribution value. Absorption intensity is calculated based on the spectral response characteristics of each of the virtual layer in the layered spectral map. The absorption intensity $A(x, \lambda)$ is computed through integration: $A(x, \lambda)=\int[\lambda1, \lambda2]$ I_baseline$(\lambda)$–I_layer$(\lambda)$ d$\lambda$, where I_baseline$(\lambda)$ is a baseline spectral intensity, and I_layer$(\lambda)$ is an actual spectral intensity of that virtual layer. The spatial distribution of material thickness is constructed using a three-dimensional (3D) interpolation to form a continuous thickness field, and the actual thickness distribution of each layer is determined in combination with the layered interface position information. Layer density is calculated using a modified Lambert-Beer law: $\rho\_layer(x, y, \lambda)=k(\lambda){\times}A(x, y, \lambda)/t\_layer(x,y)+\rho_0$, where $k(\lambda)$ is the wavelength-dependent density conversion coefficient, t_layer(x, y) is the layer thickness, and $p_0$ is a reference density. The 3D reconstruction of multi-layer density is achieved by stacking density of each of the virtual layer according to the spatial position determined by the layered interface data. The density gradient is calculated using the central difference method to compute the spatial partial derivatives, resulting in a 3D gradient vector. Finally, the material density gradient distribution values describing the spatial distribution characteristics of the material's internal density is generated.

S120, identifying a position of density mutation boundary based on the material density gradient distribution value, applying a specific frequency beam at the position of density mutation boundary to induce a resonance phenomenon and obtain the resonance response parameter of the etching paste material, generating stress field reconstruction data of the internal of the etching paste material based on the resonance response parameter.

Specifically, a gradient threshold method is used to extract regions with significant density changes to identify the position of density mutation boundary. The gradient intensity is calculated by taking the magnitude of the density gradient vector $\nabla\rho=(\partial\rho/\partial x, \partial\rho/\partial y, \partial\rho/\partial z)$. The gradient intensity $|\nabla\rho|$ is expressed as $|\nabla\rho|=\sqrt{[(\partial\rho/\partial x)^2+(\partial\rho/\partial y)^2+(\partial\rho/\partial z)^2]}$. When the gradient intensity exceeds the dynamic threshold Thr_gradient=$\mu$_gradient+2$\times$ $\sigma$_gradient, it is identified as a density mutation point, where $\mu$_gradient and $\sigma$_gradient are the mean and standard deviation of the gradient intensity in the material density gradient distribution values, respectively. The positions of density mutation boundarying is achieved through connected domain analysis, where adjacent mutation points are clustered to form mutation boundary regions. The boundary location coordinates (x_boundary, y_boundary, z_boundary) are determined by calculating a centroid. Density characteristics are extracted based on the determined boundary location coordinates, and the corresponding density value $\rho$_boundary at that location is found in the material density gradient distribution values. The precise density value at the boundary location is obtained using a 3D interpolation method. When the boundary location is not on the original sampling point, trilinear interpolation is used to calculate the density value at that location. Gradient threshold detection and connected domain analysis accurately identify the density mutation boundary location coordinates and the corresponding density characteristic values.

As shown in FIG. 4, a part of S120, applying a specific frequency beam at the position of density mutation boundary to induce a resonance phenomenon and obtain the resonance response parameter of the etching paste material includes the following steps of S1201-S1204.

S1201, performing a material characteristic analysis based on the position of density mutation boundary to obtain an inherent resonance frequency.

S1202, selecting an excitation beam frequency based on the inherent resonance frequency to obtain a frequency matching parameter.

S1203, applying the excitation beam based on the frequency matching parameter to induce the resonance phenomenon.

S1204, monitoring amplitude and phase changes of the resonance phenomenon to form the resonance response parameter of the etching paste material.

Specifically, S1201, performing a material characteristic analysis based on the position of density mutation boundary to obtain an inherent resonance frequency. Using a density-elasticity relationship model $E=k\_elastic \times \rho\_boundary^n$, where $k\_elastic$ is a material constant and n is the power exponent, the local elastic modulus is calculated based on the density value at the position of density mutation boundary. The inherent resonance frequency, recorded as f_natural, is calculated using a simplified beam vibration model:

$$f\_natural = \frac{\lambda\_n}{2\pi} \times \sqrt{E \times I / (p\_boundary \times A \times L^4)};$$

where $\lambda\_n$ is a n-th mode characteristic value, I is a moment of inertia of the cross-section, A is a cross-sectional area, and L is a characteristic length determined based on the position of density mutation boundary. The characteristic length L is determined by analyzing the density distribution around the position of density mutation boundary, using a distance where the density gradient decreases to 50% of the mutation value as the characteristic length L. Density non-uniformity correction is achieved by introducing the density variation coefficient, recorded as CV_density, $CV\_density=\sigma\_local/\rho\_boundary$, where $\sigma\_local$ is the density standard deviation in the local region around the mutation boundary. Temperature compensation considers the effect of environmental temperature on the elastic modulus, with the correction factor, recorded as k_temp, and $k\_temp=1-\alpha\_temp \times (T\_current-T\_reference)$, where $\alpha\_temp$ is the temperature coefficient. Multi-point sampling is used to calculate the inherent frequency at multiple points at the mutation boundary, and the average value is taken as the representative resonance frequency of the boundary, determining the inherent resonance frequency of the etching paste material at that position.

Figure 5:
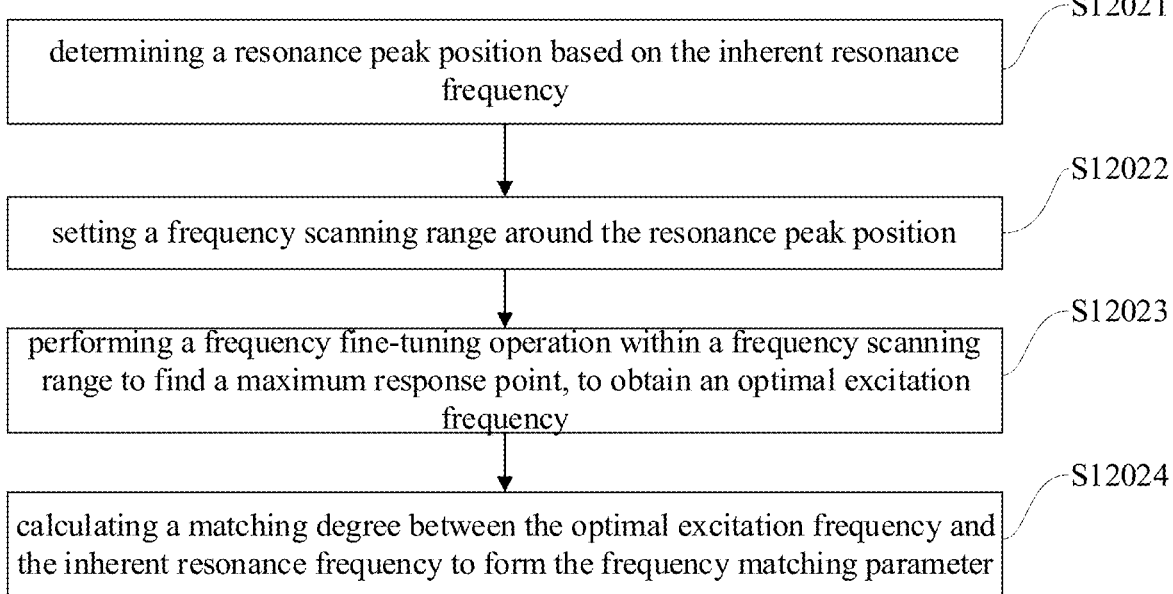
FIG. 5 is a third detailed flowchart of the method for the quality inspection of the etching paste material based on the spectral response difference according an embodiment of the present disclosure

As shown in FIG. 5, selecting an excitation beam frequency based on the inherent resonance frequency to obtain a frequency matching parameter includes the following steps of S12021 to S12024.

S12021, determining a resonance peak position based on the inherent resonance frequency.

S12022, setting a frequency scanning range around the resonance peak position;

S12023, performing a frequency fine-tuning operation within a frequency scanning range to find a maximum response point, to obtain an optimal excitation frequency.

S12024, calculating a matching degree between the optimal excitation frequency and the inherent resonance frequency to form the frequency matching parameter.

Specifically, determining theoretical resonance peak position based on the inherent resonance frequency, using a value of the inherent resonance frequency as a value of a central frequency. Considering material damping and environmental factors, theoretical resonance peak position is modified as $f\_peak\_theory=f\_natural \times (1+\delta\_shift)$. The $\delta\_shift$ is a frequency offset correction coefficient, calculated through negative correction based on a material damping ratio. The preliminary verification of the resonance peak position is achieved through single-point excitation testing, where a low power excitation signal is applied at a f_natural frequency, and the response amplitude is measured as a baseline reference.

A broadening effect of the resonance peak is estimated using the inverse relationship between a quality factor and the damping ratio, and a peak width is calculated using the ratio of central frequency to quality factor, reflecting a sharpness of the resonance peak. The recognition of multi-mode resonance determined through theoretical calculations of is possible high-order resonance frequencies, considering the impact of mode order using a square root function. For detecting bubble defects in the etching paste material, the rapid change in material density around bubbles significantly enhances the damping effect, requiring a larger negative correction of theoretical resonance peak position to ensure that the excitation frequency accurately matches the actual resonance characteristics. The impact of environmental temperature on the resonance peak position is corrected linearly using the temperature coefficient. At high temperatures, a elastic modulus of the etching paste material decreases, resulting in a lower resonance frequency.

Setting a frequency scanning range around the resonance peak position. Scanning lower and upper limits are determined by subtracting and adding the scanning half-width from the peak position, where the scanning half-width is taken as the larger of three times the resonance peak width or 5% of the peak frequency. The adaptive adjustment mechanism for the scanning range optimizes the range based on the preliminary scanning results. If the response amplitude at the boundary exceeds 30% of the response of a central region, the scanning range is extended by 50% in that direction. The frequency resolution is determined by dividing the scanning range by the number of scan points, typically set to 300 scan points, ensuring sufficient frequency accuracy. The scanning strategy combines coarse scanning for quick localization of the response region and fine scanning for precise determination of peak positions.

When detecting adhesive failure defects on the surface of battery cells, the mechanical impedance mutation at the adhesive failure boundary leads to the splitting or shifting of the resonance peak. Therefore, the scanning range needs to be expanded to capture all possible resonance modes, ensuring that critical defect feature information is not missed. Boundary condition checks are performed by monitoring the response gradient at the scanning boundaries. When the response gradient is less than the set threshold, it confirms that the scanning range is sufficient.

Performing a frequency fine-tuning operation within a frequency scanning range, to obtain a optimal excitation frequency by monitoring the response to identify the frequency that produces the maximum response. The frequency fine-tuning is carried out by stimulating and measuring the response at each frequency point within the scanning range, with the excitation signal parameters kept consistent at each frequency point. The excitation power is set to 10% of the device's maximum power, and the excitation time is set to 10 times the inverse of the current scanning frequency to ensure sufficient excitation. The response amplitude is measured through real-time imaging from the area array camera, with 50 frames of images captured at each frequency point. The response amplitude is calculated by the root mean square of pixel displacement. Frequency stepping is done in equal intervals, starting from the scanning lower limit and increasing sequentially to the upper limit of the scanning range. The maximum response point is identified by finding the global maximum value of the response amplitude array, with the corresponding frequency being the optimal excitation frequency.

The response curve is smoothed using a moving average filter, with a window length of 5 frequency points to eliminate the impact of measurement noise. Multi-peak detection is performed through a local maximum search, and when multiple local peaks are present, the peak with the largest amplitude is selected as the corresponding frequency. When detecting thickness non-uniformity defects in the etching paste, areas with significant thickness variations produce complex stress distributions, leading to multiple resonance peaks. In such cases, a systematic peak recognition algorithm is needed to identify the strongest resonance peak corresponding to the main defect feature, avoiding interference from secondary background responses. The accuracy of the frequency is enhanced by using a parabolic interpolation method, fitting a quadratic function to three data points around the maximum response point. The interpolation accuracy can reach $\frac{1}{10}$ of the scanning step size. The point-by-point scanning and multi-peak recognition algorithms successfully identify the optimal excitation frequency that generates the maximum resonance response.

Calculating a matching degree between the optimal excitation frequency and the inherent resonance frequency, and performing a quantitative analysis based on a numerical relationship between the optimal excitation frequency and the inherent resonance frequency. The frequency deviation is calculated as the absolute difference between the two frequencies, and the relative deviation is obtained by dividing the deviation by the inherent frequency and multiplying by 100%. The matching degree coefficient is calculated using a Gaussian function, with a tolerance of 2% of the inherent frequency. The matching degree coefficient varies between 0 and 1. The response enhancement ratio is calculated by dividing the maximum response amplitude at the optimal frequency by a baseline response amplitude at the non-resonant frequency. The quality factor matching degree is assessed by comparing the consistency of the measured quality factor with theoretical quality factor, taking a smaller value and dividing it by a larger value. The phase matching degree is quantified by analyzing the phase difference between the optimal frequency's phase response and theoretically expected phase, using a cosine function. The comprehensive matching parameter (F_match) is given by F_match=0.4×M_coefficient+0.3×R_enhancement/10+0.2× Q_match+0.1×Φ_match, where weights for each coefficient are 0.4, 0.3, 0.2, and 0.1, respectively, and the response enhancement ratio is normalized by dividing by 10. For slurry leakage-type defects, the local material properties change due to slurry penetration, resulting in a significant shift in the resonance frequency. This shift can be quantified through the matching degree analysis. When the comprehensive matching parameter is low, it indicates significant material abnormalities in the region, requiring further defect confirmation and classification, similar to how abnormal indicators in a health checkup signal the need for further examination. The matching level is divided based on the comprehensive matching parameter value, excellent match (>0.85), good match (0.7-0.85), fair match (0.5-0.7), and poor match (≤0.5).

Based on the frequency matching parameter, a precisely tuned excitation light beam is applied, generating a strong resonance phenomenon at the mutation boundary location. The excitation beam parameters are set based on the optimal excitation frequency f_optimal in the frequency matching parameter. The laser frequency is tuned to f_optimal, and the power is set according to the material properties and safety requirements, as P_excite=min(P_max, k_power× ρ_boundary×f_optimal), where P_max is a maximum output power of the device, and k_power is a power adjustment coefficient. The beam focusing system precisely focuses the laser beam at the mutation boundary location coordinates (x_boundary, y_boundary), with the focused spot diameter controlled to within 0.1 mm. The excitation mode uses continuous wave excitation, and the excitation time, recorded as t_excite, is set to t_excite=20/f_optimal, to ensure establishment of complete resonance. The resonance phenomenon is determined based on the time evolution characteristics of the response amplitude. Resonance is confirmed when the response amplitude grows exponentially, and the growth rate k_growth>f_optimal/10. Resonance intensity is evaluated using the quality factor Q=f_optimal/Δf_3 dB, where Δf_3 dB is the frequency bandwidth when the response amplitude decreases by 3 dB. Nonlinear effects are monitored by analyzing the harmonic components of the response signal. When the ratio of the second harmonic amplitude to the fundamental frequency amplitude exceeds 5%, significant nonlinear effects are considered to exist. Precise frequency control and power adjustment successfully establish a stable resonance phenomenon.

The changes in the amplitude and phase of the resonance phenomenon are monitored, and real-time data collection is performed based on the resonance phenomenon generated during excitation. Amplitude change monitoring is achieved through high-speed imaging with the area array camera 1, with a sampling frequency set to f_sample=10×f_optimal to ensure that the full time evolution of the resonance response is captured. Pixel displacement is calculated using a subpixel accuracy correlation matching algorithm, with displacement resolution reaching 0.01 pixels, corresponding to an actual displacement accuracy of approximately 0.1 μm. Phase change monitoring is performed by comparing the phase of the excitation signal with the phase of the response signal. The phase difference ΔΦ=phase(response)−phase (excitation) is calculated using the Hilbert transform. The time series data of the response amplitude A_response(t) and phase φ_response are obtained through synchronous acquisition, with the data length including at least 20 full resonance cycles. Frequency-domain analysis is carried out using fast Fourier transform (FFT) to extract the fundamental frequency response amplitude A_fundamental, phase φ_fundamental, and high-order harmonic components. The damping ratio ζ is calculated by fitting the exponential decay of the response envelope. After excitation stops, the response amplitude decays according to $A(t)=A\_0\times\exp(-\zeta\omega t)$. The resonance quality factor $Q\_factor=1/(2\zeta)$ reflects the energy dissipation characteristics of the material at that location. The nonlinear coefficient $\alpha\_nonlinear$ is calculated using the ratio of the third harmonic amplitude to the fundamental frequency amplitude, $\alpha\_nonlinear=A\_3rd\_harmonic/A\_fundamental^3$. High-precision synchronous acquisition and frequency-domain analysis ultimately establish the complete material resonance response parameter, including amplitude, phase, damping, and quality factor.

Reconstructing internal stress field distribution data around the mutation boundary and its surrounding region based on the resonance response parameter of the etching paste material, to generate the material's stress field reconstruction data of the internal. The stress-frequency relationship is established based on elasticity theory, with the relationship between stress and resonance frequency given by $\sigma=k\_stress\times(f\_response^2-f\_natural^2)$, where $k\_stress$ is the stress-frequency coupling coefficient. The response amplitude $A\_response$ reflects the intensity of stress concentration; a larger amplitude indicates a higher degree of stress concentration at that location. The phase information $\phi\_response$ is used to determine the direction and nature of the stress; a phase lead indicates compressive stress, while a phase lag indicates tensile stress. The damping parameter $\zeta$ reflects the energy dissipation characteristics of the material, with high damping regions usually corresponding to material defects or damage. The quality factor $Q\_factor=1/(2\times\zeta)$ provides a quantitative assessment of material integrity, with regions showing a decrease in quality factor corresponding to high stress or material damage. The principal stress direction is determined by analyzing the phase response differences when excited in different directions, with the maximum principal stress direction corresponding to the excitation direction that has the largest phase shift. The spatial distribution of the stress field is achieved by establishing a measurement grid around the mutation boundary, with grid density determined by the geometric size of the mutation boundary. The 3D stress tensor reconstruction uses amplitude and phase data from multi-directional excitation, solving for six independent stress components using the least squares method. When micro-crack defects are detected within the etching paste, the stress concentration at the crack tip causes a significant increase in resonance response amplitude, a sharp decrease in quality factor, a clear phase jump, and an increase in damping ratio. By analyzing the stress mechanics of the resonance response parameter of the etching paste material and spatial reconstruction, material stress field reconstruction data of the internal describing the stress state at the mutation boundary region is generated.

S130 determining coordinate of stress concentration point based on the stress field reconstruction data, performing a reverse optical tracking from the stress concentration point outward to obtain a defect formation path, generating degradation prediction data from the defect formation path.

Specifically, the stress concentration point coordinates are determined based on the stress field reconstruction data, and a stress peak detection algorithm is used to identify stress concentration regions. The stress field data includes the stress tensor components $\sigma\_xx$, $\sigma\_yy$, $\sigma\_zz$, $\tau\_xy$, $\tau\_yz$, $\tau\_zx$ at each position in 3D space. The stress concentration degree at each position is evaluated by calculating the equivalent stress:

$$\sigma\_eq = \frac{(\sigma\_xx - \sigma\_yy)^2 + (\sigma\_yy - \sigma\_zz)^2 + (\sigma\_zz - \sigma\_xx)^2 + 6(\tau\_xy^2 + \tau\_yz^2 + \tau\_zx^2)}{\sqrt{2}}.$$

Stress gradient calculation is achieved by performing spatial differentiation on the equivalent stress field. The gradient vector $\nabla\sigma\_eq=(\partial\sigma\_eq/\partial x, \partial\sigma\_eq/\partial y, \partial\sigma\_eq/\partial z)$ reflects the intensity of stress changes. Stress concentration point identification is done using a local maximum search method. A position is identified as a stress concentration point when its equivalent stress meets two conditions: (1) the equivalent stress exceeds twice the average stress, and (2) the magnitude of the stress gradient exceeds a set threshold. Multi-scale analysis considers stress concentration phenomena at different scales, using a Gaussian filter to smooth the stress field and identify large-scale and small-scale stress concentration features. Coordinate refinement is performed using the center of mass method to calculate the centroid of the stress concentration region, improving coordinate accuracy. Multi-peak detection identifies multiple stress concentration point, and priority is given to analyzing the primary stress concentration point based on stress intensity. Peak detection and gradient analysis accurately identify the 3D coordinates of the stress concentration point ($x\_center$, $y\_center$, $z\_center$).

As shown in FIG. 6, a part of S130 reverse optical tracking from the stress concentration point outward to obtain the defect formation path includes the following steps of S1301-S1303.

S1301, setting multiple tracking directions from the stress concentration point, including radial, tangential, and axial tracking directions.

S1302, detecting changes of optical characteristics along each of the multiple tracking directions to obtain gradient changing data.

S1303, determining possible paths of a defect extension based on the gradient changing data to generate the defect formation path.

Tracking directions are set with the stress concentration point coordinates as the starting point in a radial layout. Radial tracking directions are defined using a spherical coordinate system, with azimuth angle $\Phi$ ranging from 0° to 360° at 30° intervals (12 directions total), and elevation angle $\theta$ ranging from 0° to 180° at 45° intervals, forming a tracking network with 5 layers. Tangential tracking directions consider the principal stress directions at the stress concentration point, with preferred tracking paths set along the maximum and minimum principal stress directions. Axial tracking directions are set along main geometric axis of the etching paste material, including length, width, and thickness directions. The tracking step length is determined based on the material's characteristic dimensions, with a typical step size of 0.1 mm to ensure sufficient spatial resolution. Directional weight allocation considers the anisotropic features of stress concentration, with higher weights assigned to the principal stress direction and lower weights to secondary directions. For linear defects such as fractures in the etching paste material, defects typically extend along the stress concentration direction, so dense tracking directions are set perpendicular to the crack plane. A dynamic adjustment mechanism optimizes the direction settings based on preliminary tracking results. When a strong optical property change is observed in a direction, additional tracking paths are added nearby. Boundary limitations set the maximum tracking distance to avoid ineffective long-distance tracking, typically limiting the tracking to within a 5 mm radius around the stress concentration point.

Detecting changes of optical characteristics along each of the multiple tracking directions, point-by-point measurements are conducted along each of the predefined tracking directions, with a measurement point spacing of 0.05 mm per direction. Changes in reflectivity are monitored by recording the reflected light intensity at different positions. The reflectivity is defined as $R(x, y, z)=I\_reflected/I\_incident$, which reflects the changes in the optical properties of the material surface and interior. Transmission changes are measured by detecting light attenuation through the material. The transmittance is defined as $T(x, y, z)=I\_transmitted/I\_incident$, indicating changes in material density and structure. Scattering characteristics are analyzed by illuminating the sample at multiple angles and measuring the distribution of scattered light. Variations in scattering intensity reflect the development of internal material defects.

Polarization characteristics are detected through polarized light sources and polarization analyzers, measuring changes in birefringence effect of the etching paste material, which are closely related to stress states and structural variations. Spectral characteristics are monitored by recording responses at different wavelengths; changes in material composition or structure may result in or absorption emission shifts at specific wavelengths.

Phase changes are measured using interferometry, where changes in optical thickness cause variations in optical path difference, leading to phase shifts. Gradient calculation is performed using the finite difference method, computing spatial derivatives of each optical parameter along the tracking direction. The gradient vector is defined as $G=(\partial P/\partial s)$, where P is an optical parameter and s is the distance along the tracking direction.

The gradient magnitude is achieved by calculating the modulus of the gradient vector, $|G|=\sqrt{Gx^2+Gy^2+Gz^2}$, reflects a severity of changes in optical properties. The gradient direction is determined by the unit vector, inclination angles $\theta=\arccos(Gz/|G|)$ and $\Phi=\arctan(Gy/Gx)$, indicating the angle with respect to the z-axis, and the azimuth angle in the xy-plane. Multi-parameter fusion combines gradient intensity and direction information from various optical properties through weighted integration, forming a comprehensive variation gradient dataset that includes both gradient magnitude and inclination angles.

Determining possible paths of a defect extension based on the gradient changing data to generate the defect formation path. Potential defect propagation paths are determined based on the gradient variation data, using both gradient intensity and direction information for calculation. A gradient threshold is set to distinguish valid paths from noise. A direction is considered a valid defect propagation path when the gradient intensity $|G|$ exceeds a dynamic threshold $Thr\_gradient=\mu\_G+1.5\times\sigma\_G$, where $\mu\_G$ and $\sigma\_G$ are the mean and standard deviation of gradient intensity, respectively. Path continuity is assessed by checking the gradient continuity between adjacent measurement points. The continuity index $C=(|G\_i+1-G\_i|)/|G\_i|$ evaluates the smoothness of the gradient change. Direction consistency evaluates the stability of the gradient direction. If the angle between gradient directions of consecutive points is less than 30°, the direction is considered consistent.

Path bifurcation detection identifies locations where a single path splits into multiple sub-paths, while path convergence analysis identifies where multiple paths merge into one. Path optimization is based on the minimum energy principle, where defects tend to propagate along paths with the highest energy release rate.

In the case of stress corrosion cracking in etching paste, cracks extend along paths where chemical corrosion and mechanical stress act synergistically, often presenting as continuous gradient variations in optical characteristics.

Path geometry feature extraction includes: path length statistics, path density calculation, and path morphology analysis. path length is accumulated distance between measurement points, path density is a number of paths per unit volume, path morphology is analyzed by measuring curvature, number of branches, and spatial distribution patterns.

Propagation trend analysis is based on spatiotemporal evolution, propagation rate is estimated from the rate of change in gradient intensity at the path endpoint, directional stability is evaluated by the coefficient of variation of the path tangent direction. Temporal evolution is tracked by comparing path states over time. Path prioritization is performed based on a composite score of path length, density, and propagation rate to identify the most critical and dangerous paths. This deep analysis and feature extraction of gradient variation data result in a complete defect formation path that includes both geometric features and propagation trends.

Generating degradation prediction data based on the geometric features and propagation trends of the defect paths. Path length reflects the extent of defect propagation—the longer the path, the larger the affected region and the more severe the degradation. The path density is calculated by counting the number of paths per unit volume—higher densities indicate regions at higher risk. Propagation rate estimation is based on geometric characteristics and stress driving forces. Crack propagation is described using Paris' Law: $da/dN=C\times(\times K)^m$, where a is a crack length, N is a number of load cycles, C and m are material constants, and $\Delta K$ is the range of stress intensity factor.

Critical path identification is based on risk evaluation, considering factors such as path length, density, direction, and stress levels. Degradation mode classification is based on path morphology which includes uniform degradation, localized degradation, directional degradation, and random degradation. A time prediction model establishes the relationship between path development and time to forecast when the defect may reach a critical state. Environmental factor correction accounts for external conditions such as temperature, humidity, and chemical exposure, which can affect degradation rates.

For etching paste aging on solar cell surfaces, analysis of microcrack formation paths can help predict the time and location of macro-scale failure. Through path geometry analysis, degradation mode classification, and time prediction modeling, comprehensive degradation prediction data is generated to describe deterioration trends of the etching paste material.

S140, establishing a self-organizing optical monitoring grid in potential defect regions based on the degradation prediction data; performing an adaptive density adjustment on the self-organizing optical monitoring grid to obtain an optimized grid distribution, applying a differentiated spectral excitation to the optimized grid distribution to form a hierarchical spectral fingerprint library, generating material state boundary recognition standard based on the hierarchical spectral fingerprint library.

Specifically, establishing a self-organizing optical monitoring grid in potential defect regions based on the degradation prediction data. The initial grid construction uses path density data from the degradation prediction data to determine monitoring priorities. When path density exceeds 0.5 paths/mm³, it is designated as a high-density monitoring region; when path density is between 0.1 and 0.5 paths/mm³, it is a medium-density monitoring region; and when path density is below 0.1 paths/mm³, it is a low-density monitoring region. Grid node coordinates are distributed based on path length data. In regions with long paths, node spacing is set to 0.2 mm. In medium path regions, node spacing is set to 0.5 mm. In short path regions, node spacing is set to 1.0 mm. The grid coverage region is determined by degradation mode data. Locally use concentrated degradation regions rectangular grids, directional degradation regions use strip grids, and randomly distributed degradation regions use circular grids. The expansion rate data is used to determine the grid's time update frequency: high expansion rate regions are monitored in real time, medium expansion rate regions are monitored hourly, and low expansion rate regions are monitored daily. The grid topology adopts a hexagonal close-packing arrangement to improve spatial utilization efficiency. The spatial analysis of the degradation prediction data and the grid optimization design establishes an auto-organizing optical monitoring grid that covers all defect regions.

As shown in FIG. 7, performing an adaptive density adjustment on the self-organizing optical monitoring grid to obtain an optimized grid distribution includes the following steps of S1401 to S1403.

S1401, calculating an importance weight of each region based on the self-organizing optical monitoring grid.

S1402, generating a grid density adjustment factor based on the importance weight.

S1403, adding a density of grid points in high-weight regions based on the grid density adjustment factor to form the optimized grid distribution.

The importance weight of each region is calculated based on the position coordinates and coverage region of the grid nodes in the auto-organizing optical monitoring grid. Region division and feature analysis are performed using the Voronoi diagram method, where each grid node serves as a seed point to generate the corresponding Voronoi cell. Each cell represents the monitoring responsibility region of that node. Node density statistics are calculated by computing the ratio of the number of nodes within each Voronoi cell to the region of the cell. Overlap analysis calculates the degree of monitoring overlap between adjacent Voronoi cells, where the ratio of overlapping area to total area reflects monitoring redundancy. Node connectivity analysis uses graph theory methods to compute the degree centrality and betweenness centrality of each node, assessing the importance of each node in the network. Distance weighting considers the distance from each node to the defect center, with closer nodes receiving higher weight, calculated using an exponential decay function.

The comprehensive importance weight is obtained by a multi-criteria weighted calculation, with the following weights for each index: node density 30%, overlap degree 20%, boundary complexity 20%, connectivity 15%, and distance weight 15%. When monitoring the crack propagation at the edge of the etching paste, the crack tip region has the highest importance weight and requires the densest monitoring point distribution, while the stable regions far from the crack have lower weights. Weight normalization ensures that the sum of all weights equals 1, facilitating subsequent adjustment factor calculations. Weight grading divides continuous weight values into high, medium, and low levels.

Generating a grid density adjustment factor based on the importance weight, to establish a quantitative mapping relationship between the weight and adjustment intensity. The linear mapping relationship uses a piecewise function. For high-weight regions, the adjustment factor is $\alpha\_adjust=2.0+1.0\times(W-0.7)/0.3$, with the adjustment factor range of 2.0-3.0. For medium-weight regions, $\alpha\_adjust=1.0+1.0\times(W-0.3)/0.4$, with the adjustment factor range of 1.0-2.0. For low-weight regions, $\alpha\_adjust=0.5+0.5\times W/0.3$, with the adjustment factor range of 0.5-1.0.

A nonlinear correction introduces a quadratic term of the weight to enhance the adjustment intensity in high-weight regions. The adjustment factor is smoothed using a Gaussian filter to eliminate sudden changes in adjustment factors between adjacent regions. A dynamic adjustment mechanism adjusts the mapping parameters based on real-time monitoring results, recalculating the adjustment factor when significant changes in the weight distribution are detected. When a new defect initiation point appears in the etching paste, the importance weight of that region sharply increases, and the corresponding adjustment factor rapidly increases. The discretization of the adjustment factor quantizes continuous values into integer multiples of 0.1 to facilitate practical grid adjustment operations.

Adding a density of grid points in high-weight regions based on the grid density adjustment factor, and an intelligent grid distribution adjustment is implemented through a spatial optimization algorithm to form the optimized grid distribution. The node increase algorithm uses an adaptive subdivision method. When the adjustment factor exceeds 1.5, new nodes are added to the original grid. The addition strategy is determined by the adjustment factor high four value: adjustment factor regions use subdivisions, medium adjustment factor regions use two subdivisions, and low adjustment factor regions use one subdivision. The position of the new nodes is determined using the centroid shift algorithm, where the shift direction points toward the direction of the maximum weight gradient, and the shift distance is a certain percentage of the original node spacing. The position optimization is performed using Lloyd's algorithm, iterating to achieve uniform distribution by minimizing the variance coefficient of node distances. The grid topology update uses Delaunay triangulation to rebuild the node connection relationships, ensuring the grid's connectivity and stability. Geometric constraints consider physical boundaries and restricted regions, ensuring that new nodes do not exceed material boundaries or enter non-monitorable regions.

When monitoring stress concentration phenomena in the center region of the etching paste material, high-stress regions require denser monitoring points to capture subtle changes in the stress field. By adaptively increasing node density, the monitoring precision can be significantly improved. The spatial optimization of the adjustment factor and the intelligent distribution of nodes form the optimized grid distribution covering all key regions.

Applying differential spectral excitation to the optimized grid distribution, establishing a spectral response feature library for different grid regions using a multi-band excitation strategy. The excitation strategy is formulated based on the node density and spatial distribution in the optimized grid. The excitation wavelength bands cover ultraviolet, visible, and near-infrared regions, each subdivided into multiple sub-bands. High-density regions use full-spectrum excitation with excitation power ranging from 50 to 100 mW and excitation time of 0.5 seconds per band. Medium-density regions use dual-band excitation with visible light and near-infrared bands, excitation power ranging from 30 to 60 mW, and excitation time of 1.0 seconds per band. Low-density regions use single-band excitation, mainly in the visible light band, with excitation power ranging from 20 to 40 mW and excitation time of 2.0 seconds. The excitation sequence uses time-division multiplexing to avoid interference between adjacent node excitations. Response feature extraction includes multi-dimensional optical parameters such as reflection intensity, transmission intensity, scattering pattern, and polarization state. Spectral fingerprint construction is achieved by combining multi-band response data into a feature vector. The grading strategy is based on grid density and response intensity, establishing four levels: excellent, good, average, and poor. When establishing spectral features for regions of different thicknesses in the etching paste, significant differences in response to the same excitation wavelengths between thick and thin regions can be observed. Differential excitation can be used to establish accurate correspondence between thickness and spectral response.

The material state boundary recognition standard is generated based on the hierarchical spectral fingerprint library, establishing a quantitative mapping relationship between spectral features and material states. This is achieved by calculating the cluster centers and distribution ranges of each grade of fingerprint in the feature space. The boundary thresholds are determined by the midpoints of adjacent grade cluster centers: $T1=(C1+C2)/2$, $T2=(C2+C3)/2$, $T3=(C3+C4)/2$, where $C\_1$, $C\_2$, $C\_3$, $C\_4$ are the cluster centers of the four grades. The confidence interval settings consider the overlap degree of distributions, with uncertainty in the boundary threshold calculated by the standard deviation when the confidence level is 95%. The discriminant function uses linear discriminant analysis to establish mapping relationship from feature vectors to state grades, with a required discriminant accuracy of over 90%. Multi-dimensional feature fusion is achieved through principal component analysis to reduce feature dimensions, retaining 95% of the information and simplifying the discrimination process.

When identifying the aging degree of the etching paste material, four states—fresh material, light aging, moderate aging, and severe aging—form distinct regional distributions in the spectral feature space. Through the boundary standard, the aging state of any etching paste material sample can be accurately determined. Statistical analysis of the hierarchical spectral fingerprint library and boundary optimization ultimately generates a complete material state boundary recognition standard.

S150, detecting a phase transition critical point of the etching paste material based on the material state boundary recognition standard to obtain a phase transition boundary, applying a pulsed beam near the phase transition boundary to induce surface deformation of the etching paste material and obtain surface deformation response characteristics, generating material stability boundary parameters based on the surface deformation response characteristics.

Specifically, phase transition boundary is calculated based on the boundary thresholds T1, T2, T3 in the material state boundary recognition standard. The critical point identification uses a boundary approximation method, searching for locations where material features change sharply near the boundary thresholds of adjacent state grades. The search algorithm creates a scanning grid along the material surface with a grid spacing of 0.05 mm, measuring spectral feature vectors at each grid point. The distance between the feature vector and the boundary threshold is calculated using Euclidean distance, and when the distance is less than $0.1\times\sigma\_boundary$, where $\sigma\_boundary$ is the standard deviation of the boundary threshold, the point is considered close to the phase transition critical state. Critical point classification is based on the type of boundary it is close to: points close to T1 are classified as excellent-good phase transition points, points close to T2 as good-ordinary phase transition points, and those close to T3 as ordinary-poor phase transition points.

The phase transition boundary includes critical point coordinates (x_critical, y_critical), phase transition type, critical strength, and stability evaluation. When detecting the temperature phase transition characteristics of the etching paste, the material undergoes a transition from solid to semi-liquid at a specific temperature, which corresponds to a significant change in the material's spectral features. The critical strength is calculated from the magnitude of the feature vector gradient, with larger gradients indicating more intense phase transitions. Stability evaluation considers the spatial distribution of features around the critical point, where more uniform distributions indicate more stable phase transitions. The phase transition boundary mapping connects all critical points to form a continuous boundary line, with mapping accuracy controlled within 0.02 mm. The final phase transition boundary includes critical point coordinates, phase transition types, and critical strength.

As shown in FIG. 8, a part of the S150, applying a pulsed beam near the phase transition boundary to induce surface deformation of the etching paste material and obtain surface deformation response characteristics includes the following steps of S1501-S1504.

S1501, setting multiple synchronous excitation points in a boundary region based on the phase transition boundary.

S1502, applying a pulsed beam to the multiple synchronous excitation points to obtain combined excitation energy.

S1503, generating material cooperative surface deformation through the combined excitation energy to obtain enhanced deformation effect.

S1504, monitoring a propagation mode and a recovery characteristic of the enhanced deformation effect to form the surface deformation response characteristics.

The synchronous excitation points are arranged based on the critical point coordinates and phase transition types from the phase transition boundary. The excitation point distribution uses the critical point coordinates as reference positions, with 3-5 excitation points set within a 0.5 mm range around each critical point. The excitation point spacing is determined by the phase transition type, excellent-good phase transition regions have excitation point spacing of 0.2 mm, good-ordinary phase transition regions have spacing of 0.3 mm, ordinary-poor phase transition regions have spacing of 0.5 mm, excitation point numbering uses a region index and sequence number for synchronized control and data management. The excitation sequence is designed considering the continuity of the phase transition boundary, with excitation applied sequentially along the boundary direction to ensure coherence in deformation propagation. The excitation intensity distribution is based on the critical strength data, with higher excitation power allocated to regions with higher critical strength. The time synchronization uses a master-slave control mode, where the master controller sends a synchronization and all signal, excitation points start simultaneously upon receiving the signal.

When analyzing the stress release characteristics at the edge of the etching paste, multiple excitation points are set near the stress-concentrated phase transition boundary. Synchronized excitation simulates multi-point stress action under real-world conditions. The spatial analysis of the phase transition boundary and the excitation point optimization establish a multi-point synchronized excitation network that covers all phase transition regions.

Applying a pulsed beam to the multiple synchronous excitation points to obtain combined excitation energy. Pulse parameters include pulse width, power density, and repetition frequency, where pulse width is set between 10-50 ns, power density is set between 1-10 MW/cm$^2$, repetition frequency is set between 1-100 Hz. Synchronization accuracy is controlled using an atomic clock reference, with time deviations for each excitation point kept within 1ns. The energy superposition effect is achieved through wavefront interference, where multiple pulse beams converge on the material surface, generating constructive interference to enhance excitation energy. The energy density in the superposition region is calculated using the vector superposition principle, with total energy density being the coherent sum of energies from all excitation points. Phase control ensures all pulse beams maintain phase coherence in the superposition region to maximize the energy superposition effect. Energy distribution monitoring is carried out using a high-speed spectrometer to measure the energy density distribution in the superposition region. Pulse shape optimization uses a Gaussian distribution to ensure energy concentration and smooth boundaries.

When multiple excitation points simultaneously apply pulses to the microcrack regions on the etching paste surface, the superimposed excitation energy can effectively stimulate crack propagation, revealing the material's fracture characteristics. Energy stability control is achieved through power feedback adjustment, ensuring consistent output power across all excitation points.

Generating material cooperative surface deformation through the combined excitation energy, and a spatial coupling effect of multi-point excitation enhances the deformation, to obtain enhanced deformation effect. The deformation mechanisms include various physical processes, such as thermal expansion, photoelastic strain, and phonon excitation, which are coupled under the action of superimposed energy to produce a synergistic effect. The deformation amplitude is measured using laser interferometry, achieving a measurement precision at the nanometer level. The spatial deformation distribution is realized through full-field measurement, recording the deformation amount and direction at each point on the material's surface. Time evolution of deformation monitors the establishment, development, and attenuation of deformation, with a sampling frequency of 1 MHz. The synergistic effect is manifested as the nonlinear enhancement of deformation amplitude, where the total deformation is greater than the linear sum of the deformations caused by individual excitation points. The enhancement factor is defined as the ratio of cooperative deformation to independent deformation. An enhancement factor greater than 1 indicates the presence of a synergistic effect. Deformation mode analysis includes three components: radial deformation, tangential deformation, and vertical deformation, with each mode reflecting different material response characteristics.

In a viscoelastic testing of the etching paste material, the surface deformation generated by multi-point cooperative excitation reveals the material's time-dependent response, providing important information for material performance evaluation. Deformation correlation analysis calculates the correlation coefficients between deformations generated at different excitation points, with high correlation indicating strong synergistic effects. Nonlinear effect recognition is achieved through the nonlinear analysis of the deformation-excitation energy relationship, the with nonlinear coefficient reflecting the material's constitutive properties. The cooperative action of superimposed excitation energy and the deformation coupling effect generates cooperative deformation on the material surface with enhanced characteristics.

The propagation mode and recovery characteristics of the enhanced deformation effect are monitored. The propagation mode monitoring includes the propagation speed, propagation direction, and attenuation characteristics of the deformation wave. The propagation speed is calculated using the time difference between adjacent measurement points, and the propagation direction is determined by the angle of the deformation gradient. Wavefront shape analysis describes the geometric characteristics of deformation propagation, including types such as circular wavefronts, elliptical wavefronts, and irregular wavefronts. Attenuation characteristics are described by the change in deformation amplitude with distance, and an exponential decay model is used to fit the decay coefficient. Recovery characteristics monitoring includes recovery time, recovery degree, and recovery path. Recovery time is defined as the time when the deformation amplitude decreases to 10% of the initial value. Recovery degree is assessed by the ratio of the final residual deformation to the initial deformation, with a smaller ratio indicating more complete recovery. Recovery path analysis tracks the time evolution of deformation during the recovery process, including modes such as monotonic recovery, oscillatory recovery, and multi-stage recovery. Frequency domain analysis is achieved by performing Fourier transformation on the deformation time series to extract the characteristic frequency and damping properties of the deformation response.

When detecting a dynamic modulus of the etching paste material, the propagation mode reflects elastic properties of the etching paste material, while the recovery characteristics reflect its viscous properties. The combination of both can comprehensively assess a viscoelastic performance of the etching paste material. Phase delay analysis calculates the phase difference between the deformation response and the excitation signal, with the phase difference reflecting energy dissipation characteristics of the etching paste material. Spatial correlation analysis calculates the correlation of deformation responses at different positions, revealing the spatial uniformity of the material. Dynamic monitoring and feature extraction of the enhanced deformation effect form the surface deformation response characteristics, which include propagation mode, recovery characteristics, and frequency domain features.

Stability boundary parameters are generated based on propagation mode, recovery characteristics, and frequency domain features of the surface deformation response characteristics. The stability assessment metrics include three dimensions: propagation consistency, recovery integrity, and frequency stability. Propagation consistency is assessed by the spatial uniformity of the propagation mode, with the standard deviation of the propagation direction and the coefficient of variation of propagation speed reflecting the material's isotropy. Recovery integrity is evaluated by the time stability of recovery characteristics, with the monotonicity of the recovery path and the consistency of recovery degree reflecting the elastic stability of the etching paste material. Frequency domain stability is evaluated by the reproducibility of frequency domain features, with the deviation in characteristic frequency and the variation in damping characteristics reflecting the material's dynamic stability. The boundary parameters include three levels:

stability threshold, early warning range, and failure boundary. The stability threshold is determined based on the uniformity index of the propagation mode. The early warning range is set based on the degree of deviation in the recovery characteristics, and the failure boundary is defined by the abnormal changes in the frequency domain features.

Parameter mapping establishes the correspondence between deformation feature patterns and stability grades, using pattern recognition methods to process complex feature combinations. Based on the surface deformation response characteristics and boundary definitions, the material stability boundary parameters are finally generated.

S160, constructing a multi-point linked defect blocking network based on the material stability boundary parameters, performing a defect analysis on the multi-point linked defect blocking network to form an interconnected optical energy field, monitoring a cooperative response of the interconnected optical energy field to obtain network stability data; determining a material quality grade based on the network stability data.

Specifically, the multi-point coordinated defect blocking network is constructed based on the stability threshold, the early warning range, and the failure boundary of the material stability boundary parameters. The network node settings are based on the stability threshold, with major blocking nodes set in regions close to the stability threshold. The node spacing is determined by the early warning range. Major blocking nodes are placed at positions of weakest stability with node spacing at 0.5 times the early warning range, secondary blocking nodes are placed at positions of medium stability with node spacing at 1.0 times the early warning range, and auxiliary blocking nodes are placed at positions of better stability with node spacing at 2.0 times the early warning range. Network connections are designed based on the failure boundary data. Strong connections are established when the stability difference between two nodes exceeds the failure boundary, medium connections are made when the difference is within the early warning range, and weak connections are made when the difference is within the stability threshold.

The topology structure adopts a hierarchical network design, including core layer, aggregation layer, and access layer. When constructing the etching paste surface crack blocking network, dense blocking nodes are set at the crack tips and stress concentration regions, with sparse monitoring nodes set in stable regions, forming a gradient protection system. The node functions include defect detection, signal transmission, and energy regulation. The network mapping of material stability boundary parameters and topology optimization establishes a multi-point coordinated defect blocking network that includes multi-level nodes and multi-type connections.

As shown in FIG. 9, a part of S150, performing a defect analysis on the multi-point linked defect blocking network to form an interconnected optical energy field includes the following steps of S1601-S1604.

S1601, determining an energy requirement of each of blocking points based on the multi-point linked defect blocking network.

S1602, establishing energy transmission channels between each of the blocking points based on the energy requirements.

S1603, achieving energy balance between the blocking points through the energy transmission channels to obtain a distributed energy field.

S1604, performing a network integration processing on the distributed energy field to form an interconnected optical energy field.

Firstly, the energy requirements of each blocking point are determined based on the function level and coverage range of each node in the multi-point coordinated defect blocking network. The energy requirement of the main blocking node is determined based on its blocking capacity requirement, which needs to block the propagation of the maximum defect intensity. The energy requirement is given by $E\_main=k\_main \times A\_coverage \times I\_max$, where $k\_main$ is the main node coefficient, $A\_coverage$ is the coverage region, and $I\_max$ is the maximum defect intensity. The energy requirement of the secondary blocking node is 60%-80% of the main node's energy requirement, while the auxiliary node requires 30%-50% of the main node's energy requirement. Node load assessment considers the connectivity and centrality of the node in the network, with highly connected nodes undertaking more collaborative tasks and requiring higher energy reserves. For blocking nodes located at the edge stress concentration regions of the etching paste material, their energy requirements are significantly higher than those of monitoring nodes in stable regions due to the need to handle high-intensity stress propagation.

Next, based on the energy requirements, energy transfer channels are established between blocking points. The capacity of these channels is designed based on the maximum energy transfer requirement, with the main channel transmission capacity given by $P\_main=1.5 \times max(E\_demand)$, and the secondary transmission capacity given by $P\_secondary=1.2 \times avg(E\_demand)$. The shortest path algorithm is used to optimize the transmission path, choosing the shortest distance path under the capacity constraint. Transmission efficiency optimization considers transmission loss and delay, where transmission loss is proportional to the transmission distance, and delay is inversely proportional to the channel capacity. Optical transmission is achieved using optical fibers or waveguides, with transmission losses controlled in the range of 0.1-0.5 dB/km. When the energy demand of a blocking point suddenly increases, the transmission power of adjacent channels is automatically adjusted to ensure timely energy supply.

Then, energy balance between points is achieved through the energy transfer channels using a diffusion model, where high-energy nodes transfer energy to low-energy nodes until balance is reached. The balance objective function is to minimize the variance of energy across nodes, $F=min(\sigma^2\_energy)$, where $\sigma^2\_energy$ is the variance of the energy of the nodes. Energy flow calculation is based on the gradient descent principle, where energy flows from high-potential points to low-potential points, and the flow rate is proportional to the potential gradient. Distributed control avoids the risks of single-point control, with each node having a certain degree of autonomous adjustment capability. During the quality inspection of etching paste material, when a large-region defect occurs in a region, the energy consumption of the blocking nodes in that region increases sharply, and energy is automatically redistributed from surrounding nodes to maintain the overall energy field stability. The balance control of the energy transfer channels and the distributed adjustment form a stable distributed energy field with adaptive ability.

Finally, Performing a network integration processing on the distributed energy field. An integration architecture adopts a hierarchical design, including a physical layer, a network layer, and an application layer. The physical layer is responsible for energy generation, transmission, and distribution; the network layer s responsible for information transmission and coordination; the application layer is responsible for function implementation and optimization. A cooperative control algorithm coordinates the operation of each subsystem to ensure the optimization of overall performance. Information fusion technology processes the status information of each node to form a global energy field situation. Spatial interpolation methods are used for energy field interpolation between nodes to form a continuous energy field distribution. Time synchronization ensures the cooperative operation of nodes, with synchronization accuracy controlled within milliseconds, ultimately forming an interconnected optical energy field with global coordination capabilities.

Cooperative response monitoring is based on the operational status and response characteristics of the interconnected optical energy field for real-time data collection. The response characteristics include three dimensions: response speed, response intensity, and response consistency. Response speed is measured by the time difference between the excitation signal and the response signal, with response time varying in the range of milliseconds to seconds. Response intensity is evaluated by the amplitude ratio of the output signal to the input signal, where the intensity ratio reflects the amplification or attenuation characteristics of the energy field. Response consistency is analyzed through the correlation of responses from different nodes, with a higher correlation coefficient indicating better coordination. The spatial response distribution is obtained through full-field measurement, recording the response state of the energy field at each spatial point. Time response evolution monitors the establishment, development, and stabilization processes of the response, analyzing the dynamic characteristics of the response. The response establishment time is measured during the rising phase of the signal, and the stabilization time is determined by the duration of the response in a steady state. Frequency domain response characteristics are obtained through spectral analysis, identifying the characteristic frequency and resonant modes of the energy field.

When a test signal is applied to the etching paste material, the cooperative response of the interconnected energy field reveals the overall performance of the material and the impact of local Stability indicators include parameters such as response deviation, fluctuation amplitude, and recovery time. The cooperative monitoring and response analysis of the interconnected optical energy field generate network stability data, including response characteristics, stability indicators, and dynamic time parameters.

Determining the material quality grade based on network stability data, and establishing the mapping relationship between network performance and material quality. The quality grading system adopts a four-level classification, including excellent, good, qualified, and unqualified grades. The criteria for classifying materials as excellent are: response speed <50 ms, response intensity deviation <5%, response consistency >0.95, response establishment time <30 ms, and stability time >400 ms. The criteria for good materials are: response speed <100 ms, response intensity deviation <10%, response consistency >0.90, response establishment time <60 ms, and stability time >300 ms. The criteria for qualified materials are: response speed <300 ms, response intensity deviation <20%, response consistency >0.80, response establishment time <120 ms, and stability time >100 ms. Unqualified materials are those that do not meet the requirements for the qualified grade. The comprehensive scoring algorithm calculates a weighted average of multiple indicators, with weight distribution as follows:

response characteristics 40%, stability indicators 35%, and dynamic time parameters 25%. Through the comprehensive analysis of network stability data and grade mapping, the material quality grade classification results are obtained.

S170, identifying abnormal position coordinates based on the material quality grade and the network stability data, obtaining the abnormal position coordinates, performing a phase adjustment on the hierarchical spectral fingerprint library to obtain a phase difference spectral set, conducting a phase comparison marking on the abnormal position coordinates using the phase difference spectral set, completing the quality inspection of the etching paste material based on the spectral response difference.

Specifically, based on the material quality grade and network stability data, the quality abnormal position is identified using a multi-level screening approach. First, a coarse screening is performed based on the material quality grade, marking unqualified and partially qualified materials as potential abnormal regions. Fine screening is based on specific network stability data indicators. If the response speed is greater than 300 ms, response intensity deviation is greater than 20%, or response consistency is less than 0.80, the point is marked as an abnormal position. Dynamic time parameter anomalies are determined by response establishment time greater than 120 ms or stabilization time less than 100 ms. Spatial clustering analysis groups neighboring abnormal points to form abnormal regions, with the clustering radius set to 1.0 mm. If there are more than 3 abnormal points within the cluster, it is confirmed as a quality abnormal position. The abnormal position coordinates are calculated using the region's centroid, with coordinate precision controlled within 0.01 mm. The severity of the abnormal is evaluated based on the deviation of abnormal indicators, with larger deviations indicating severe more anomalies. Abnormal type classification includes three types: response abnormal, stability abnormal, and dynamic abnormal. During the detection of the etching paste batch quality, certain regions may experience network response anomalies due to material inhomogeneity or process defects. Abnormal detection allows precise localization of these problem regions. The abnormal position mapping marks all abnormal coordinates on a two-dimensional map of the material surface, forming an intuitive abnormal distribution map.

As shown in FIG. 10, a part of S170, performing the phase adjustment on the hierarchical spectral fingerprint library to obtain the phase difference spectral set includes the following steps of S1701-S1703.

S1701, extracting a real-time phase state of each of light spectrums in different grades from the hierarchical spectral fingerprint library.

S1702, establishing a dynamic phase tracking mechanism based on the real-time phase state.

S1703, performing an adaptive phase modulation on the light spectrums through the dynamic phase tracking mechanism to obtain the phase difference spectral set.

The real-time phase states of spectra at each quality level are extracted from the graded spectral fingerprint library, and phase feature information corresponding to different quality levels is obtained through phase analysis techniques. The phase state extraction is based on the spectral fingerprint data of four levels: excellent, good, average, and poor from the graded spectral fingerprint library. Phase analysis is performed using the Hilbert transform method, separating the real and imaginary parts of the spectral fingerprint. The phase angle $\theta=\arctan(Im/Re)$, where Im is the imaginary part and Re is the real part. The phase distribution characteristics of spectra at each level are obtained through statistical analysis, including phase mean, phase standard deviation, and phase distribution range. The phase distribution of excellent spectra is relatively concentrated with a small phase standard deviation, while the phase distribution of good and average spectra gradually spreads out. The phase distribution of poor spectra is the most dispersed. Phase stability is evaluated through reproducibility the analysis of repeated phase measurements, with stable levels showing higher phase reproducibility. Phase spectrum analysis unfolds the phase information in the frequency domain, identifying characteristic phase frequencies for spectra at different levels. When analyzing the spectral characteristics of the etching paste at different aging stages, the phase of fresh materials is relatively stable, while aged materials exhibit significant phase deviation and dispersion. The real-time phase state includes three parameters: instantaneous phase value, phase change rate, and phase stability. The instantaneous phase value reflects the current phase state, the phase change rate reflects dynamic the characteristics of the phase, and phase stability reflects the reliability of the phase. After phase analysis and feature extraction from the graded spectral fingerprint library, real-time phase state data corresponding to each level of spectrum is generated.

A dynamic phase tracking mechanism is established based on real-time phase states using the Kalman filtering method, creating a dynamic model for the phase state, predicting future phase states, and performing real-time corrections. The state equation describes the time evolution of the phase, while the observation equation describes the measurement relationship of the phase. The filtering gain is adaptively adjusted based on the phase change rate and phase stability; the gain is increased when the phase change is large and reduced when the phase is stable. Tracking accuracy is evaluated through statistical analysis of prediction errors, with tracking accuracy required to be within ±0.1 radians. Multi-level parallel tracking monitors the phase states of the four quality levels simultaneously, with each level running independently to avoid interference. Phase jump detection identifies sudden changes in phase. When the phase change rate exceeds a set threshold, the jump handling is triggered. When phase transitions or new defects occur in the etching paste material, the phase of the corresponding level spectrum will jump, and the tracking mechanism will capture this change promptly. The tracking results include three outputs: phase trajectory, phase prediction, and phase confidence. The phase trajectory records the historical evolution of the phase, the phase prediction provides phase estimates for future moments, and phase confidence reflects the reliability of the predictions.

Through the dynamic phase tracking mechanism, self-adaptive phase modulation is performed on spectra of different levels to obtain a phase difference spectral set. The modulation strategy uses phase correction methods to eliminate phase shifts caused by factors such as environmental temperature changes, light source fluctuations, and device aging, maintaining standard phase characteristics for spectra at each level. The reference phase is selected as the phase of the excellent-level spectrum, and the phases of other levels are corrected relative to the reference phase. The correction algorithm performs feedback adjustment based on the prediction error of the phase tracking mechanism. When phase deviations from the standard value are detected, automatic compensation is made. The spectra at good, average, and poor levels are each corrected accordingly, with correction accuracy controlled within ±0.01 radians. The adaptive mechanism adjusts the correction amplitude according to real-time environmental parameters, ensuring the stability of phase features for spectra at each level. During long-term testing, light source aging causes a general phase shift in spectra, but phase correction can eliminate this system error, maintaining consistency and accuracy in the detection results. Correction verification is carried out by comparing the phase stability before and after correction, generating a phase difference spectral set for the four standard spectra: excellent, good, average, and poor.

Phase comparison marking is based on the phase difference spectral set of four-level spectra and abnormal position coordinates for matching analysis. The comparison algorithm measures the actual spectral phase at each abnormal position and compares it one by one with the phases of the four-level spectra in the phase difference spectral set. The phase similarity is calculated using the phase correlation coefficient, with the level having the highest correlation coefficient being marked as the quality level of the abnormal position. The marking accuracy is verified by the statistical analysis of phase differences, with a larger phase difference indicating higher marking accuracy. The phase feature extraction of the abnormal position includes three parameters: phase mean, phase variance, and phase shift, which are compared with the corresponding parameters of the standard levels. The quality inspection results include the quality level determination for the abnormal position, severity assessment of the abnormal, and phase deviation analysis, forming a complete quality inspection report. When the phase features of an abnormal position closely match the poor-level spectrum, it is marked as a severe quality abnormal, requiring special attention and treatment. After the quality inspection, a quality distribution map for the abnormal positions is generated, visually displaying the material's surface quality condition and abnormal distribution, ultimately completing the material quality inspection based on spectral response difference for the etching paste.

Figure 11:
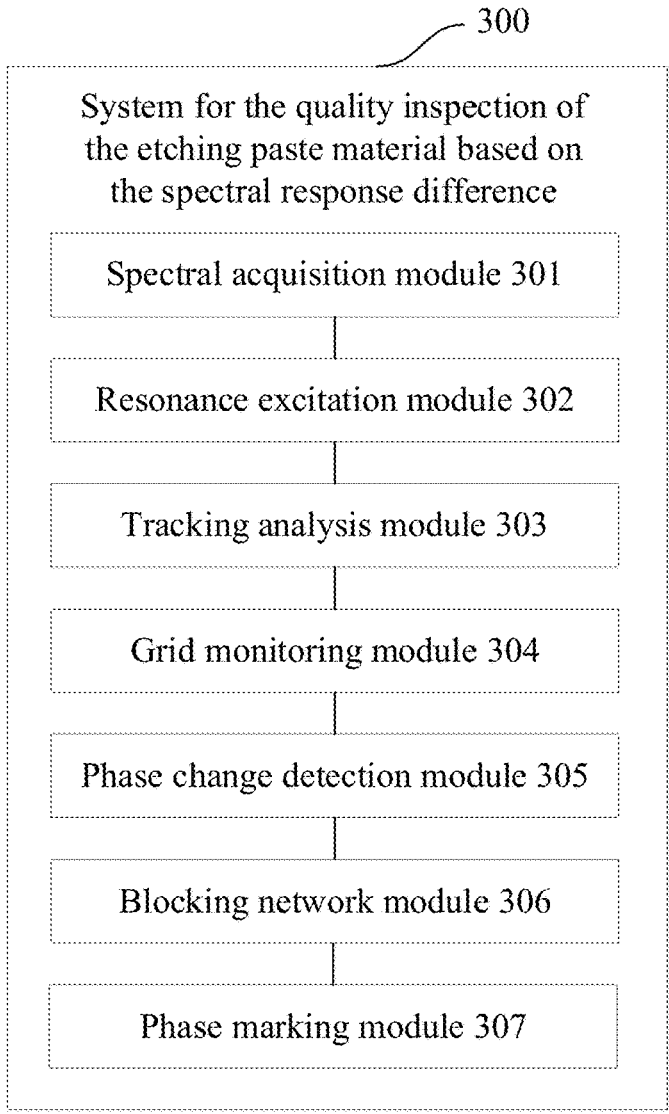
FIG. 11 is a block diagram of a method for quality inspection of an etching paste material based on a spectral response difference according an embodiment of the present disclosure.

In order to implement the spectral response difference-based material quality inspection method corresponding to the above method example, and to achieve the corresponding functions and technical effects, refer to FIG. 11, which shows a block diagram of a system for a quality inspection of an etching paste material based on a spectral response difference 300 based on spectral response difference, as provided by the embodiment of the present application. For clarity, only the parts related to this embodiment are shown. The system for the quality inspection of the etching paste material based on the spectral response difference 300 includes the following modules.

Spectral acquisition module 301, configured to obtain multi-band spectral signals and a material thickness from a surface of the etching paste material, performing a spectral tomography decomposition based on the multi-band spectral signals to obtain a layered spectral map of a internal of the etching paste material, combining the material thickness with the layered spectral map to generate material density gradient distribution values.

Resonance excitation module 302, configured to identify a position of density mutation boundary based on the material density gradient distribution values, applying a specific frequency beam at the position of density mutation boundary to induce a resonance phenomenon and obtain the resonance response parameter of the etching paste material, generating stress field reconstruction data of the internal of the etching paste material based on the resonance response parameter.

Tracking analysis module 303, configured to determine coordinate of stress concentration point based on the stress field reconstruction data, performing a reverse optical tracking from the stress concentration point outward to obtain a defect formation path, generating degradation prediction data from the defect formation path.

Grid monitoring module 304, configured to establish a self-organizing optical monitoring grid in potential defect regions based on the degradation prediction data; performing an adaptive density adjustment on the self-organizing optical monitoring grid to obtain an optimized grid distribution, applying a differentiated spectral excitation to the optimized grid distribution to form a hierarchical spectral fingerprint library, generating a material state boundary recognition standard based on the hierarchical spectral fingerprint library.

Phase change detection module 305, configured to detect a phase transition critical point of the etching paste material based on the material state boundary recognition standard to obtain a phase transition boundary, applying a pulsed beam near the phase transition boundary to induce surface deformation of the etching paste material and obtain surface deformation response characteristics, generating material stability boundary parameters based on the surface deformation response characteristics.

Blocking network module 306, configured to construct a multi-point linked defect blocking network based on the material stability boundary parameters, performing a defect analysis on the multi-point linked defect blocking network to form an interconnected optical energy field, monitoring a cooperative response of the interconnected optical energy field to obtain network stability data; determining a material quality grade based on the network stability data.

Phase marking module 307, configured to identifying abnormal position coordinates based on the material quality grade and the network stability data, obtaining the abnormal position coordinates, performing a phase adjustment on the hierarchical spectral fingerprint library to obtain a phase difference spectral set, conducting a phase comparison marking on the abnormal position coordinates using the phase difference spectral set, completing the quality inspection of the etching paste material based on the spectral response difference.

The above-described system for the quality inspection of the etching paste material based on the spectral response difference 300 can implement the method for the quality inspection of the etching paste material based on the spectral response difference described in the embodiments. The optional elements in the embodiments are also applicable to this embodiment, and will not be elaborated upon here. The remaining contents of this embodiment can refer to those in the method embodiments and will not be repeated.

The method for the quality inspection of the etching paste material based on the spectral response difference is processed by an equipment for a quality inspection of an etching paste material based on a spectral response difference.

Figure 12:
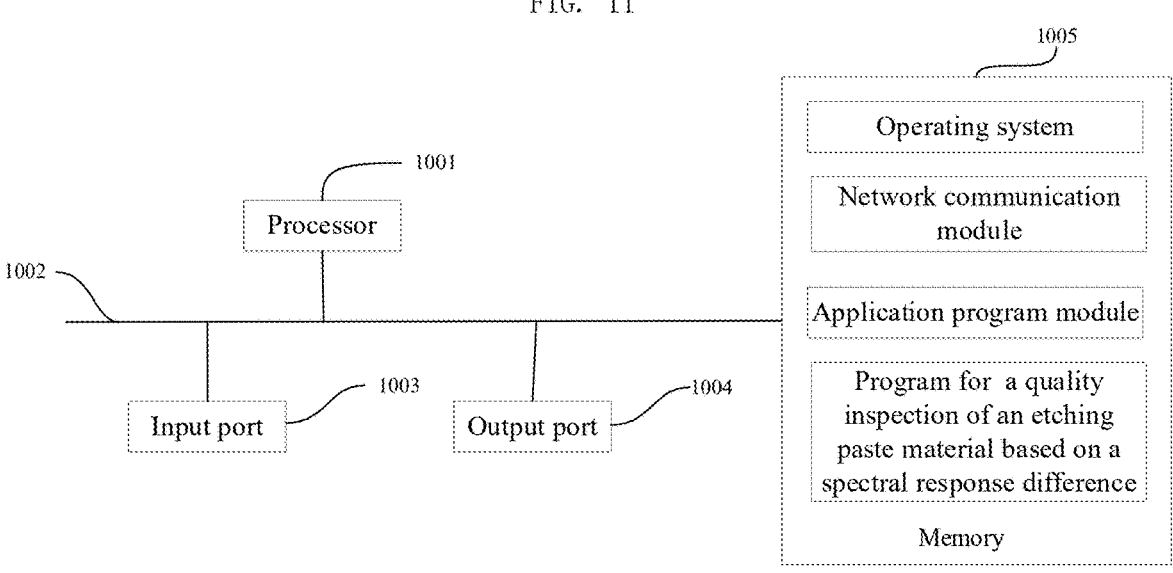
FIG. 12 is a schematic diagram of a hardware structure of the equipment for quality inspection of etching paste material based on spectral response difference.

As shown in FIG. 12, the equipment for the quality inspection of the etching paste material based on the spectral response difference includes: a processor 1001 (such as Central Processing Unit, CPU), a communication bus 1002, an input port 1003, an output port 1004, and a memory 1005. Among them, the communication bus 1002 is used to achieve connection communication between these components; the input port 1003 is used for data input; and the output port 1004 is used for data output, and the memory 1005 can be high-speed RAM memory or non volatile memory, such as disk memory, non-transitory computerreadable storage medium. Optionally, memory 1005 is a storage device independent of the aforementioned processor 1001

The memory 1005, as a non-volatile readable storage medium, may include an operating system, network communication module, application program module, and a program for an quality inspection of an etching paste material based on a spectral response difference. The network communication module is mainly used to connect to servers and communicate data with them. And processor 1001 is used to call the program to process the method stored in memory 1005, and execute all steps of the method for the quality inspection of the etching paste material based on the spectral response difference mentioned above.

The purpose of the above embodiments is to provide an exemplary reproduction and derivation of the technical solution of this disclosure, fully describing its technical solutions, objectives, and effects. The goal is to enable the public to gain a more thorough and comprehensive understanding of the disclosed contents of this disclosure, but this should not limit the scope of protection of the disclosure.

The above embodiments are not an exhaustive list of all possible embodiments of the disclosure. Other embodiments not listed here may exist. Any modifications or improvements made without deviating from the inventive concept of the disclosure are within the scope of protection of the disclosure.

What is claimed is:

1. A method for a quality inspection of an etching paste material based on a spectral response difference, comprising:

obtaining, using a multi-band spectral acquisition system, multi-band spectral signals and a material thickness from a surface of the etching paste material, wherein the multi-band spectral acquisition system comprises an area array camera, a multi-band light source system, a thickness measurement module, and a trigger controller synchronizing illumination and image capture;

performing a spectral tomography decomposition based on the multi-band spectral signals to obtain a layered spectral map of an internal of the etching paste material;

generating material density gradient distribution values by calculating an absorption intensity for each virtual layer based on spectral response characteristics in the layered spectral map, determining a layer thickness distribution based on the material thickness and layered interface position information, calculating a layer density based on the absorption intensity and the layer thickness distribution, and computing spatial gradients of the layer density;

identifying a position of density mutation boundary based on the material density gradient distribution values;

applying an excitation beam at the position of density mutation boundary to induce a resonance phenomenon and obtain a resonance response parameter of the etching paste material, including selecting an excitation beam frequency based on an inherent resonance frequency at the position of density mutation boundary and a frequency scanning and fine-tuning operation to obtain an optimal excitation frequency, and obtaining the resonance response parameter by monitoring at least amplitude and phase changes of the resonance phenomenon;

generating stress field reconstruction data of the internal of the etching paste material based on the resonance response parameter;

determining coordinate of stress concentration point based on the stress field reconstruction data, performing a reverse optical tracking from the stress concentration point outward to obtain a defect formation path, generating degradation prediction data from the defect formation path; and establishing a self-organizing optical monitoring grid in potential defect regions based on the degradation prediction data; performing an adaptive density adjustment on the self-organizing optical monitoring grid to obtain an optimized grid distribution, applying a differentiated spectral excitation to the optimized grid distribution to form a hierarchical spectral fingerprint library, generating a material state boundary recognition standard based on the hierarchical spectral fingerprint library; and detecting a phase transition critical point of the etching paste material based on the material state boundary recognition standard to obtain a phase transition boundary;

applying a pulsed beam at multiple synchronous excitation points set within a boundary region surrounding the phase transition boundary to induce surface deformation of the etching paste material and obtain surface deformation response characteristics, generating material stability boundary parameters based on the surface deformation response characteristics; and constructing a multi-point linked defect blocking network based on the material stability boundary parameters, performing a defect analysis on the multi-point linked defect blocking network by determining an energy requirement of each of blocking points, establishing energy transmission channels between each of the blocking points based on the energy requirements, achieving energy balance between the blocking points through the energy transmission channels to obtain a distributed energy field, and performing a network integration processing on the distributed energy field to form an interconnected optical energy field, monitoring a cooperative response of the interconnected optical energy field to obtain network stability data; determining a material quality grade based on the network stability data; and identifying abnormal position coordinates based on the material quality grade and the network stability data, obtaining the abnormal position coordinates, performing a phase adjustment on the hierarchical spectral fingerprint library to obtain a phase difference spectral set, conducting a phase comparison marking on the abnormal position coordinates using the phase difference spectral set to complete the quality inspection of the etching paste material based on the spectral response difference.

2. The method for the quality inspection of the etching paste material based on the spectral response difference according to claim 1, wherein performing a spectral tomography decomposition based on the multi-band spectral signals to obtain layered spectral map of an internal of the etching paste material comprises:

determining penetration depths of different bands based on the multi-band spectral signals;

performing a virtual layering on the etching paste material based on the penetration depths to obtain layered interface data;

extracting spectral response characteristics of each of virtual layers based on the layered interface data to obtain the layered spectral map of the internal of the etching paste material material.

3. The method for the quality inspection of the etching paste material based on the spectral response difference according to claim 1, wherein applying a specific frequency beam at the position of density mutation boundary to induce a resonance phenomenon and obtain the resonance response parameter of the etching paste material comprises:

performing a material characteristic analysis based on the position of density mutation boundary to obtain an inherent resonance frequency;

selecting an excitation beam frequency based on the inherent resonance frequency to obtain a frequency matching parameter;

applying the excitation beam based on the frequency matching parameter to induce the resonance phenomenon;

monitoring amplitude and phase changes of the resonance phenomenon to form the resonance response parameter of the etching paste material.

4. The method for the quality inspection of the etching paste material based on the spectral response difference according to claim 1, wherein reverse optical tracking from the stress concentration point outward to obtain the defect formation path comprises:

setting multiple tracking directions from the stress concentration point, including radial, tangential, and axial tracking directions;

detecting changes of optical characteristics along each of the multiple tracking directions to obtain gradient changing data;

determining possible paths of a defect extension based on the gradient changing data to generate the defect formation path.

5. The method for the quality inspection of the etching paste material based on the spectral response difference according to claim 1, wherein performing an adaptive density adjustment on the self-organizing optical monitoring grid to obtain an optimized grid distribution comprises:

calculating an importance weight of each region based on the self-organizing optical monitoring grid;

generating a grid density adjustment factor based on the importance weight;

adding a density of grid points in high-weight regions based on the grid density adjustment factor to form the optimized grid distribution.

6. The method for the quality inspection of the etching paste material based on the spectral response difference according to claim 1, wherein applying a pulsed beam near the phase transition boundary to induce surface deformation of the etching paste material and obtain surface deformation response characteristics includes:

setting multiple synchronous excitation points in a boundary region based on the phase transition boundary;

applying a pulsed beam to the multiple synchronous excitation points to obtain combined excitation energy;

generating material cooperative surface deformation through the combined excitation energy to obtain enhanced deformation effect;

monitoring a propagation mode and a recovery characteristic of the enhanced deformation effect to form the surface deformation response characteristics.

7. The method for the quality inspection of the etching paste material based on the spectral response difference according to claim 1, wherein performing the phase adjustment on the hierarchical spectral fingerprint library to obtain the phase difference spectral set includes:

extracting a real-time phase state of each of light spectrums in different grades from the hierarchical spectral fingerprint library;

establishing a dynamic phase tracking mechanism based on the real-time phase state;

performing an adaptive phase modulation on the light spectrums through the dynamic phase tracking mechanism to obtain the phase difference spectral set.

8. The method for the quality inspection of the etching paste material based on the spectral response difference according to claim 3, wherein selecting an excitation beam frequency based on the inherent resonance frequency to obtain a frequency matching parameter includes:

determining a resonance peak position based on the inherent resonance frequency;

setting a frequency scanning range around the resonance peak position;

performing a frequency fine-tuning operation within a frequency scanning range to find a maximum response point, to obtain an optimal excitation frequency;

calculating a matching degree between the optimal excitation frequency and the inherent resonance frequency to form the frequency matching parameter.

\* \* \* \* \*